US012547338B2

United States Patent
Kim et al.

(10) Patent No.: US 12,547,338 B2
(45) Date of Patent: Feb. 10, 2026

(54) STORAGE APPARATUS AND METHOD FOR DATA INTEGRITY

(71) Applicant: Samsung Electronics Co., Ltd., Suwon-si (KR)

(72) Inventors: Jisoo Kim, Suwon-si (KR); Younsung Chu, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 36 days.

(21) Appl. No.: 18/333,994

(22) Filed: Jun. 13, 2023

(65) Prior Publication Data

US 2024/0168675 A1 May 23, 2024

(30) Foreign Application Priority Data

Nov. 23, 2022 (KR) .................. 10-2022-0158461

(51) Int. Cl.
G06F 3/06 (2006.01)

(52) U.S. Cl.
CPC ............ G06F 3/0655 (2013.01); G06F 3/061 (2013.01); G06F 3/0619 (2013.01); G06F 3/0679 (2013.01)

(58) Field of Classification Search
CPC ...... G06F 3/0655; G06F 3/061; G06F 3/0619; G06F 3/0679
See application file for complete search history.

(56) References Cited

U.S. PATENT DOCUMENTS

| | | | |
|---|---|---|---|
| 11,341,108 B2 | 5/2022 | Butcher | |
| 11,403,169 B2 | 8/2022 | Fackenthal et al. | |
| 2007/0005935 A1* | 1/2007 | Khosravi | G06F 12/1416 |
| | | | 711/E12.098 |
| 2016/0232354 A1* | 8/2016 | Fraser | G06F 21/554 |
| 2019/0044702 A1 | 2/2019 | Natu et al. | |
| 2021/0026543 A1 | 1/2021 | Trikalinou et al. | |
| 2021/0182208 A1* | 6/2021 | Palmer | G06F 12/1491 |
| 2021/0311643 A1 | 10/2021 | Shanbhogue et al. | |
| 2022/0012088 A1 | 1/2022 | Guim Bernat et al. | |
| 2022/0012188 A1 | 1/2022 | Durham et al. | |
| 2022/0207193 A1 | 6/2022 | Caraccio et al. | |

(Continued)

OTHER PUBLICATIONS

Extended European Search Report dated Jan. 25, 2024 issued in corresponding European Appln. No. 23191546.3.

(Continued)

*Primary Examiner* — Mark A Giardino, Jr.
(74) *Attorney, Agent, or Firm* — HARNESS, DICKEY & PIERCE, P.L.C.

(57) ABSTRACT

Disclosed is a storage apparatus for data integrity. The storage apparatus includes a hash value table configured to store information on a secured area in a main memory of a host communicating through a compute express link (CXL) interface and a hash value corresponding to the secured area, and a monitoring controller configured to read sensitive data stored in the secured area from the main memory through the CXL interface based on the information on the secured area, calculate a hash value of the sensitive data, compare the hash value of the sensitive data with the hash value corresponding to the secured area to determine whether the sensitive data is falsified, and recover the falsified sensitive data in response to determining that the sensitive data is falsified.

17 Claims, 18 Drawing Sheets

(56) References Cited

U.S. PATENT DOCUMENTS

| | | | |
|---|---|---|---|
| 2022/0342984 A1* | 10/2022 | Villatel | G06F 21/552 |
| 2023/0273740 A1* | 8/2023 | Hironaka | G06F 3/065 |
| 2024/0086291 A1* | 3/2024 | Guim Bernat | G06F 11/3471 |
| 2024/0095375 A1* | 3/2024 | Kumar | G06F 21/602 |
| 2024/0160388 A1* | 5/2024 | Song | G06F 3/0623 |

OTHER PUBLICATIONS

Petroni, Jr., Nick L. et al. "Copilot—a Coprocessor-based Kernel Runtime Integrity Monitor." Proceedings of the 13th USENIX Security Symposium, San Diego, CA; Aug. 9-13, 2004.

* cited by examiner

| | TO-BE MONITORED ADDRESS | HASH VALUE OF MONITORING DATA | MONITORING INTERVAL (optional) |
|---|---|---|---|
| MD1 | ADDR1 | HASH1 | T1 |
| MD2 | ADDR2 | HASH2 | T2 |
| ⋮ | ⋮ | ⋮ | ⋮ |
| MDn | ADDRn | HASHn | Tn |

| TO-BE MONITORED ADDRESS | HASH VALUE OF MONITORING DATA | ADDRESS OF MONITORING DATA | MONITORING INTERVAL (optional) |
|---|---|---|---|
| MD1 | ADDR1 | HASH1 | LBA1 | T1 |
| MD2 | ADDR2 | HASH2 | LBA2 | T2 |
| ... | ... | ... | ... | ... |
| MDn | ADDRn | HASHn | LBAn | Tn |

STORAGE APPARATUS AND METHOD FOR DATA INTEGRITY

CROSS-REFERENCE TO RELATED APPLICATION

This application claims priority to and the benefit of Korean Patent Application No. 10-2022-0158461 filed in the Korean Intellectual Property Office on Nov. 23, 2022, the entire contents of which are incorporated herein by reference.

BACKGROUND

(1) Field

The disclosure relates to a storage apparatus and method for data integrity.

(2) Description of the Related Art

Various computer systems use memory devices to store data. The memory device stores sensitive data such as kernel image data and system credential data. Data stored in the memory device may be falsified by a row hammer attack, malware infection, etc., from the outside. When the sensitive data stored in the memory device is falsified, attackers may freely have unlimited access to the entire computer system. Therefore, the computer system may detect whether the sensitive data has been falsified and take appropriate action accordingly to ensure the integrity of the data stored in the memory device.

SUMMARY

The present disclosure provides a storage apparatus and method for data integrity having advantages of easily determining whether data stored in a memory device is falsified.

The present disclosure provides storage apparatus and method for data integrity having advantages of detecting whether data is falsified while maintaining performance of a host and power consumption.

An example embodiment of the present disclosure provides a storage apparatus including a hash value table configured to store information on a secured area in a main memory of a host communicating through a compute express link (CXL) interface and a hash value corresponding to the secured area, and a monitoring controller configured to read sensitive data stored in the secured area from the main memory through the CXL interface based on the information on the secured area, calculate a hash value of the sensitive data, compare the hash value of the sensitive data with the hash value corresponding to the secured area to determine whether the sensitive data is falsified, and recover the falsified sensitive data in response to determining that the sensitive data is falsified.

Another example embodiment of the present disclosure provides a method for data integrity including receiving a monitoring request including information on a location in a main memory from a host through a compute express link (CXL) interface, reading data stored in the location from the main memory based on the information on the location through the CXL interface, calculating a hash value of the data, storing, in a hash value table, the information on the location and the hash value of the data as information on a secured area and a hash value corresponding to the secured area, respectively, reading sensitive data stored in the secured area from the main memory based on the information on the secured area through the CXL interface, calculating a hash value of the sensitive data, and comparing the hash value of the sensitive data with the hash value corresponding to the secured area to determine whether the sensitive data is falsified.

Yet another example embodiment of the present disclosure provides a computer system, including a host configured to transmit a monitoring request including information on a location in memory, and a first CXL device configured to receive the monitoring request through a compute express link (CXL) interface, read data stored in the location from the memory based on information on the location through the CXL interface, calculate a hash value of the data, store, in a hash value table, the information on the location and the hash value of the data as information on a secured area and a hash value corresponding to the secured area, respectively, read sensitive data stored in the secured area from the memory based on information on the secured area through the CXL interface, calculate the hash value of the sensitive data, and compare the hash value of the sensitive data with the hash value corresponding to the secured area to determine whether the sensitive data is falsified.

BRIEF DESCRIPTION OF THE DRAWINGS

FIG. 6 is a diagram illustrating a hash value table of the CXL storage device according to an example embodiment.

FIG. 8 is a diagram illustrating the hash value table of the CXL storage device according to an example embodiment.

DETAILED DESCRIPTION

Figure 1:
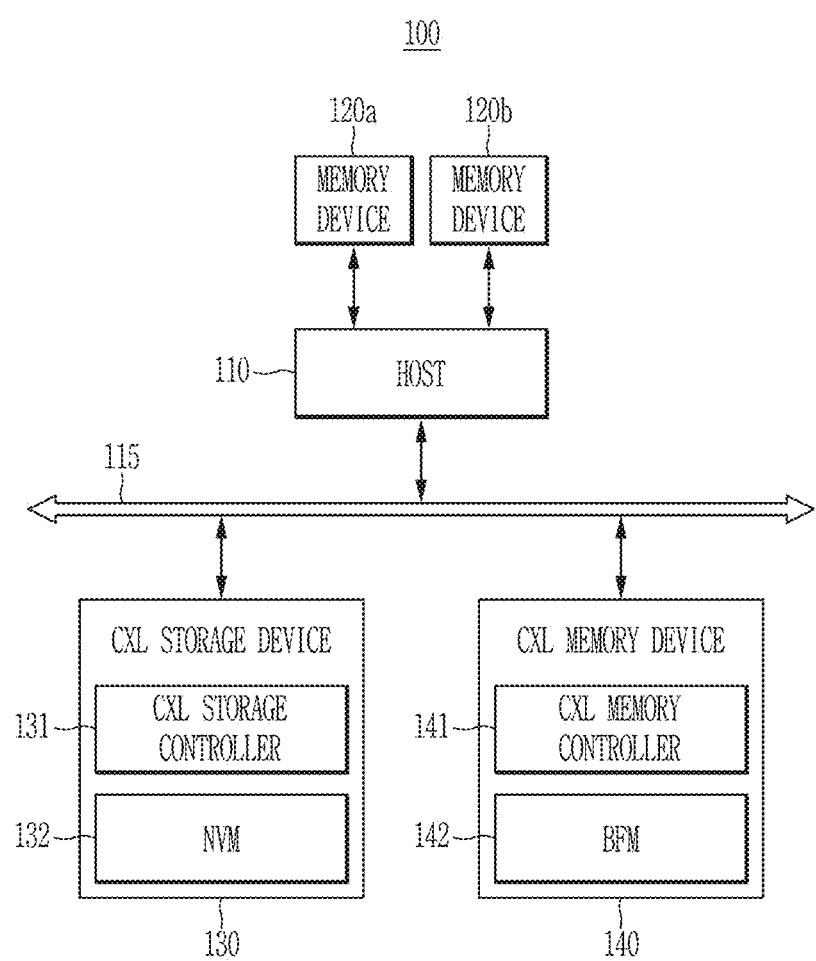
FIG. 1 is a block diagram of a computer system according to an example embodiment.

In the following detailed description, only certain example embodiments of the present disclosure have been shown and described, simply by way of illustration. As those skilled in the art would realize, the described example embodiments may be modified in various different ways, all without departing from the spirit or scope of the present invention.

Accordingly, the drawings and description are to be regarded as illustrative in nature and not restrictive. Like reference numerals designate like elements throughout the specification. In flowcharts described with reference to the drawings, an order of operations may be changed, several operations may be merged, some operations may be divided, and specific operations may not be performed.

In addition, an expression written in singular may be construed in singular or plural unless an explicit expression such as "one" or "single" is used. Terms including an ordinal number such as first, second, etc., may be used to describe various components, but the components are not limited to these terms. These terms may be used for the purpose of distinguishing one component from other components.

FIG. 1 is a block diagram of a computer system according to an example embodiment.

Referring to FIG. 1, a computer system 100 may include a host 110, a plurality of memory devices 120a and 120b, and at least one compute express link (CXL) device 130 or 140. In one example embodiment, the computer system 100 is user devices such as a personal computer, a laptop computer, a server, a media player, a digital camera, or the like, or automotive devices such as navigation, a black box, and an automotive electronic device. Alternatively, the computer system 100 may be a mobile system such as a mobile phone, a smart phone, a tablet personal computer, a wearable device, a healthcare device, or an Internet of things (JOT) device.

The host 110 may control overall operations of the computer system 100. In an example embodiment, the host 110 may be one of various processors such as a central processing unit (CPU), a graphics processing unit (GPU), a neural processing unit (NPU), and a data processing unit (DPU). In an example embodiment, the host 110 may include a single core processor or a multi-core processor.

The plurality of memory devices 120a and 120b may be used as main memory or system memory of the computer system 100. In an example embodiment, each of (or alternatively, at least one of) the plurality of memory devices 120a and 120b may be a dynamic random access memory (DRAM) device and may have a form factor of a dual in-line memory module (DIMM). However, the scope of the present disclosure is not limited thereto, and the plurality of memory devices 120a and 120b may include non-volatile memories such as flash memory, PRAM, RRAM, and MRAM.

The plurality of memory devices 120a and 120b may directly communicate with the host 110 through a double data rate (DDR) interface. In an example embodiment, the host 110 may include a memory controller configured to control the plurality of memory devices 120a and 120b. However, the scope of the present disclosure is not limited thereto, and the plurality of memory devices 120a and 120b may communicate with the host 110 through various interfaces.

The CXL storage device 130 may include a CXL storage controller 131 and a non-volatile memory (NVM) 132. The CXL storage controller 131 may store the data in the non-volatile memory 132 or transmit data stored in the non-volatile memory 132 to the host 110 under the control of the host 110. In an example embodiment, the non-volatile memory 132 may be a NAND flash memory, but the scope of the present disclosure is not limited thereto. In an example embodiment, the CXL storage device 130 may monitor data stored in at least one of the plurality of memory devices 120a and 120b. In some example embodiments, the CXL storage device 130 may recover data stored in at least one of the plurality of memory devices 120a and 120b. For example, the CXL storage device 130 may determine whether data stored in the memory device 120a is falsified, and when it is determined that the data stored in the memory device 120a is falsified, the falsified data may be recovered as data stored in the non-volatile memory 132.

The CXL memory device 140 may include a CXL memory controller 141 and a buffer memory (BFM) 142. The CXL memory controller 141 may store data in the buffer memory 142 or transmit the data stored in the buffer memory 142 to the host 110 under the control of the host 110. In an example embodiment, the buffer memory 142 may include one of DRAM, High Bandwidth Memory (HBM), Hybrid Memory Cube (HMC), DIMM, Optane DIMM, Non-Volatile DIMM (NVMDIMM), Double Data Rate Synchronous DRAM (DDR SDRAM), and Low-Power Double Data Rate Synchronous Dynamic Random Access Memory (LPDDR SDRAM), or a combination thereof. In an example embodiment, the CXL memory device 140 may monitor data stored in at least one of the plurality of memory devices 120a and 120b. In some example embodiments, the CXL memory device 140 may recover data stored in at least one of the plurality of memory devices 120a and 120b. For example, the CXL memory device 140 may determine whether the data stored in the memory device 120a is falsified, and when it is determined that the data stored in the memory device 120a is falsified, the falsified data may be recovered as data stored in the buffer memory 142 or data stored in the non-volatile memory 132 of the CXL storage device 130.

Each of (or alternatively, at least one of) the CXL storage controller 131 and the CXL memory controller 141 may include an intellectual property (IP) circuit designed to implement an application specific integrated circuit (ASIC) and/or a field-programmable gate array (FPGA). In various example embodiments, each of (or alternatively, at least one of) the CXL storage controller 131 and the CXL memory controller 141 may be implemented to support the CXL protocol (e.g., CXL 2.0 protocol or any other version). The CXL storage controller 131 may convert a CXL packet and signals of a memory interface of the non-volatile memory 132 to each other. The CXL memory controller 141 may convert the CXL packet and the signals of the memory interface of the buffer memory 142 to each other.

In an example embodiment, each of (or alternatively, at least one of) the at least one CXL device 130 or 140 may be implemented as an individual device or module. The CXL devices may be connected to a cache-coherency interface 115 through different physical ports. That is, as at least one CXL device 130 or 140 is connected to the cache-coherency interface 115, a memory area managed by the host 110 may be high-capacity.

In an example embodiment, the host 110 and at least one CXL device 130 or 140 may be configured to share the same interface. For example, the host 110, the CXL storage device 130, and the CXL memory device 140 may communicate with each other through the cache-coherency interface 115. The host 110 may access the non-volatile memory 132 of the CXL storage device 130 through the cache-coherency interface 115, the CXL storage device 130 may also access the memories 120a, 120b of the host 110 and/or the buffer memory 142 of another CXL device 140 through the cache-coherency interface 115, and the CXL memory device 140 may also access the memories 120a, 120b of the host 110 and/or the non-volatile memory 132 of another CXL device 130 through the cache-coherency interface 115.

In an example embodiment, the cache-coherency interface 115 may point to a low-latency and high-bandwidth link that supports coherency, memory access, and dynamic protocol muxing of the IO protocol to enable various connections between accelerators, memory devices, or various electronic devices. Hereinafter, for convenience of explanation, it is assumed that the host 110 and at least one CXL device 130 or 140 communicate with each other through the CXL interface 115. However, the cache-coherency interface 115 is not limited thereto, and the host 110 and at least one CXL device 130 or 140 may communicate with each other based on various computer interfaces such as the GEN-Z protocol, NVLink protocol, CCIX protocol, and Open CAPI protocol.

The CXL is an open industry standard for communications based on Peripheral Component Interconnect Express (PCIe) 5.0, and may provide a fixed and relatively short packet size, resulting in relatively high bandwidth and relatively low fixed latency. As such, the CXL may support the cache-coherency and the CXL may be well suitable for generating connections to memory. The CXL may be used to provide a connection between the host 110 and at least one CXL device 130 or 140 (e.g., accelerator, memory device, and network interface circuit (or "network interface controller" or network interface card (NIC))) in a server.

The cache-coherency protocols such as the CXL may also be used for heterogeneous computers, for example, in scalar, vector, and buffered memory systems. The CXL may be used to provide the cache-coherency interface by using channels, retimers, a PHY layer of the system, logical aspects of the interface, and protocols from the PCIe 5.0. A CXL transaction layer may include three multiplexed sub-protocols operating concurrently on a single link and may be referred to as CXL.io, CXL.cache, and CXL.mem, respectively. CXL.io may include I/O semantics that may be similar to the PCIe. The CXL.cache may include caching semantics, the CXL.mem may include memory semantics, and both the caching semantic and the memory semantic may be optional. Like the PCIe, the CXL may support (i) default widths of x16, x8, and x4 that can be divided, (ii) data rates of 8 GT/s and 16 GT/s, and 32 GT/s that can be performance deterioration to 128b/130b, (iii) 300 W (75 W in x16 connector), and (iv) plug and play. To support the plug-and-play, the PCIe or CXL device link may start training on the PCIe in Gen 1, negotiate the CXL and complete Gen 1-5 training and then start the CXL transaction.

Figure 2:
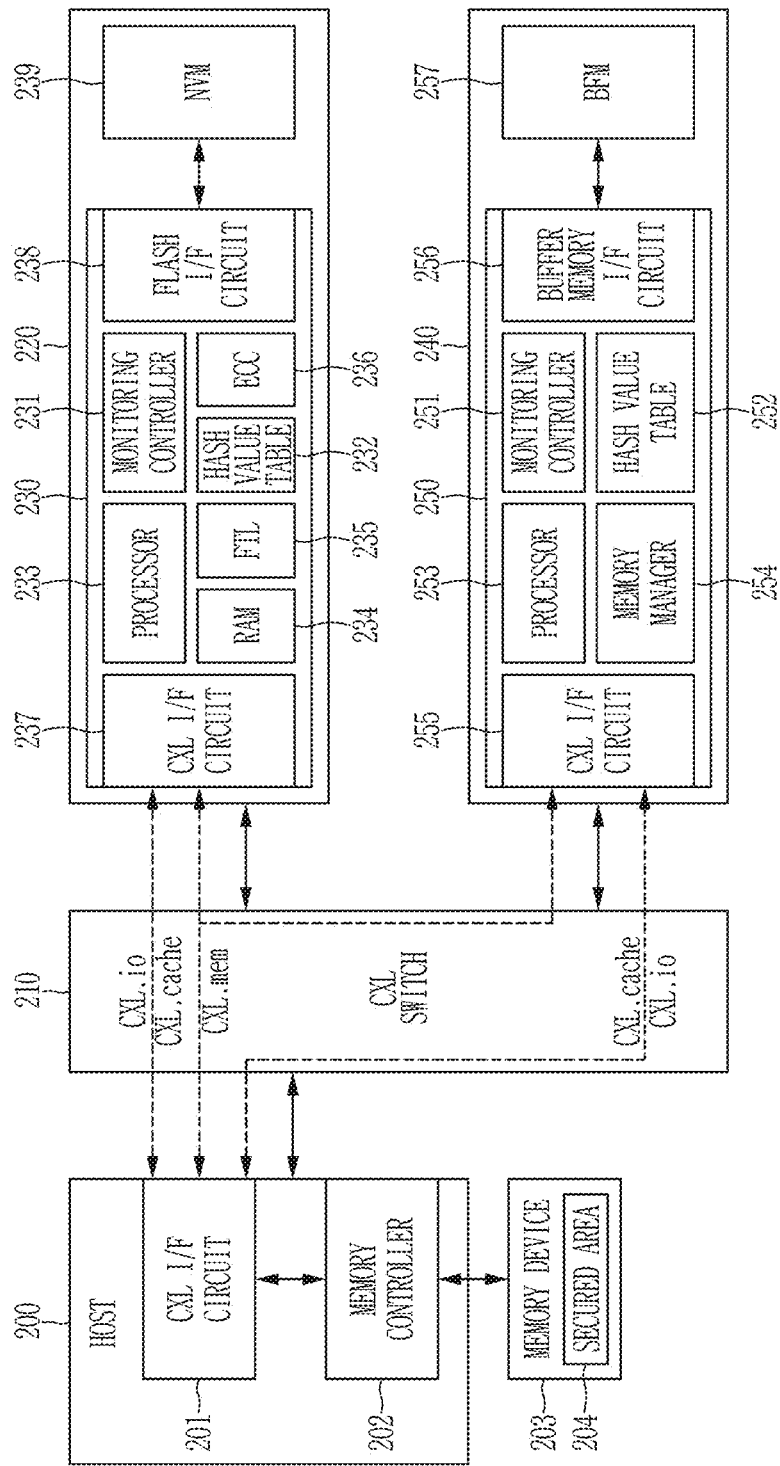
FIG. 2 is a detailed block diagram of some components of the computer system according to an example embodiment.

FIG. 2 is a detailed block diagram of some components of the computer system according to an example embodiment.

Referring to FIG. 2, a host 200 and CXL devices 220 and 240 may communicate with each other through a CXL switch 210. The CXL switch 210 may be a component included in the CXL interface. The CXL switch 210 may be configured to relay communication between the host 200 and the CXL devices 220 and 240. For example, when the host 200 and the CXL devices 220 and 240 communicate with each other, the CXL switch 210 may be configured to transmit information such as requests, data, responses, or signals transmitted from the host 200 or the CXL devices 220 and 240 to the CXL devices 220 and 240 or the host 200. When the CXL devices 220 and 240 communicate with each other, the CXL switch 210 may be configured to transmit the information such as requests, data, responses, or signals between the CXL devices 220 and 240.

The host 200 may include CXL host interface circuit 201. The CXL host interface circuit 201 may communicate with the CXL device 220 through the CXL switch 210. The CXL host interface circuit 201 may be coupled to the memory controller 202 and the related memory device 203.

In an example embodiment, the host 200 and the CXL devices 220 and 240 may perform device attestation. For example, the host 200 may verify integrity of firmware and configuration of the CXL devices 220 and 240. The host 200 may check whether normal firmware is running in the CXL devices 220 and 240 and whether hardware and software settings are normal. In some example embodiments, the host 200 and the CXL devices 220 and 240 may conform to the Security Protocol and Data Model (SPDM) over Management Component Transport Protocol (MCTP) architecture/protocol. The SPDM may be used for the device attestation between the host 200 and the CXL devices 220 and 240.

When the device attestation of the host 200 and the CXL devices 220 and 240 is performed, a secure channel may be formed between the host 200 and the CXL devices 220 and 240 and between the CXL devices 220 and 240. CXL Integrity and Data Encryption (IDE) may be configured over the secure channel. The CXL.io IDE complies with the PCIe IDE, and the CXL.cachemem IDE may be configured via CXL.cachemem IDE Key Management Agent (CIKMA). In an example embodiment, the CXL.io IDE key and the CXL.cachemem IDE key may be different keys. The host 200 and the CXL devices 220 and 240 may transmit and receive encrypted data using the CXL.io IDE key and the CXL.cachemem IDE key. It is assumed that data transmission and reception between the host 200 and the CXL devices 220 and 240 described below is performed through the CXL IDE.

In an example embodiment, the host 200 may store sensitive data requiring security (or alternatively, which a user desires to have security) in the memory device 203. The host 200 may store sensitive data in the secured area 204 of the memory device 203. The sensitive data may include a system manufacturer's certificate, a kernel image, a digital signature value for the kernel image, a device driver, a security policy, a master key, etc. The host 200 may receive sensitive data from at least one of the CXL devices 220 and 240 and store the received sensitive data in the memory device 203. In some example embodiments, the host 200 may receive sensitive data from the CXL storage device 220 and store the received sensitive data in the CXL memory device 240.

In an example embodiment, the host 200 may transmit a monitoring request including information on a location where sensitive data is stored to at least one of the CXL devices 220 and 240. The host 200 may generate the information on the location of the secured area 204 in which sensitive data is stored. For example, the host 200 may generate a start address and length information indicating a location of sensitive data in the memory device 203. In some example embodiments, when the host 200 stores the sensitive data in the CXL memory device 240, the host 200 may generate the start address and length information indicating the location of the sensitive data in the buffer memory 257. When the host 200 stores the sensitive data in the CXL storage device 220, the host 200 may generate a start address and length information indicating a location of the sensitive data in the RAM 234.

In some example embodiments, the monitoring request may further include a hash value of sensitive data. The host 200 may generate a hash value by performing a hash operation on the sensitive data. The monitoring request may further include information on sensitive data storage locations of the CXL devices 220 and 240 that have transmitted the sensitive data to the host 200. The host 200 may receive sensitive data from at least one of the CXL devices 220 and 240 based on the location where the sensitive data of the CXL devices 220 and 240 is stored, and store the received sensitive data in the memory device 203. The host 200 may generate a monitoring request including information on the location where the sensitive data of the CXL devices 220 and 240 are stored and the location of the memory device 203 where the sensitive data is stored.

In some example embodiments, the monitoring request may further include information on a monitoring interval. The host 200 may generate information on a monitoring interval or monitoring condition corresponding to sensitive data. When there is a plurality of sensitive data, the host 200 may generate a monitoring request by setting different monitoring intervals and conditions for each sensitive data. For example, the host 200 may set the importance of each of the sensitive data, and may set different monitoring intervals and conditions according to the importance. A monitoring interval of sensitive data having a high importance may be shorter than that of sensitive data having a low importance.

In some example example embodiments, the monitoring request may further include the information on the recovery policy. For example, the recovery policy may include a first policy and a second policy. According to the first policy, when the CXL devices 220 and 240 that have received the monitoring request determine that the sensitive data is falsified, the CXL devices 220 and 240 may notify the host 200 that the data has been falsified. According to the second policy, when the CXL devices 220 and 240 that have received the monitoring request determine that the sensitive data is falsified, the CXL devices 220 and 240 may directly recover the falsified sensitive data.

The CXL switch 210 may be used to implement a memory cluster through one-to-many and many-to-one switching between the connected CXL devices 220 and 240 (e.g., (i) CXL switch 210 may connect a plurality of root ports to one endpoint, (ii) connect one root port to a plurality of endpoints, or (iii) connect a plurality of root ports to a plurality of endpoints).

In addition to providing a packet-switching function for the CXL packet, the CXL switch 210 may be used to connect the CXL devices 220 and 240 to one or more hosts 200. The CXL switch 210 (i) allows the CXL devices 220 and 240 to include various types of memories having different characteristics, (ii) allows the memories of the CXL devices 220 and 240 to be virtualized and data of different characteristics (e.g., access frequency) to be stored in an appropriate type of memory, and (iii) supports remote direct memory access (RDMA). Here, "virtualizing" the memory means performing memory address translation between a processing circuit and the memory.

The CXL storage device 220 may include a CXL storage controller 230 and a non-volatile memory 239. The CXL storage controller 230 may include a monitoring controller 231 and a hash value table 232. In addition, the CXL storage controller 230 includes a processor 233, a RAM 234, a flash translation layer (FTL) 235, an error correction code (ECC) engine 236, a CXL storage interface circuit 237, and a flash interface circuit 238.

The monitoring controller 231 may receive the monitoring request from the host 110. In an example embodiment, the monitoring controller 231 receiving the monitoring request may store a location in the memory device 203 in which sensitive data is stored and a hash value of the sensitive data as the hash value table 232. For example, the monitoring controller 231 may read sensitive data from the memory device 203 based on the location in the memory device 203 that stores the sensitive data of the monitoring request. The monitoring controller 231 that has received the monitoring request may store the location in the buffer memory 257 of the CXL memory device 240 in which the sensitive data is stored and the hash value of the sensitive data as the hash value table 232. The monitoring controller 231 may read the sensitive data from the buffer memory 257 based on the location of the buffer memory 257 that stores the sensitive data of the monitoring request. The monitoring controller 231 may generate a hash value by performing a hash operation on the read sensitive data. In some example embodiments, when the monitoring request further includes a logical block address of the non-volatile memory 239, the monitoring controller 231 may store the location in the memory device 203 where the sensitive data is stored, the logical block address of the non-volatile memory 239, and the hash value of the sensitive data as the hash value table 232. When the monitoring request further includes the monitoring interval and/or the recovery policy, the monitoring controller 231 may store the hash value table 232 further including the monitoring interval and/or the recovery policy.

The monitoring controller 231 may monitor the sensitive data by referring to the hash value table 232. The monitoring controller 231 may read the sensitive data based on the location where the sensitive data of the hash value table 232 is stored. For example, the monitoring controller 231 may read the sensitive data from the memory device 203 based on the location of the memory device 203 that stores the sensitive data of the hash value table 232. The monitoring controller 231 may read the sensitive data from the buffer memory 257 based on the location of the buffer memory 257 in which the sensitive data of the hash value table 232 is stored. The monitoring controller 231 may determine whether the sensitive data is falsified by referring to the hash value table 232. For example, the monitoring controller 231 may perform the hash operation on the read sensitive data and compare the sensitive data with the hash value stored in the hash value table 232. The monitoring controller 231 may determine that the sensitive data is not falsified when the two hash values match, and determine that the sensitive data is falsified when the two hash values are different. In some example embodiments, the monitoring controller 231 may refer to the monitoring interval of the hash value table 232 to determine a timing to monitor the sensitive data.

The monitoring controller 231 may refer to the hash value table 232 to notify the host 200 of whether the sensitive data is falsified or recover the sensitive data. For example, when the logical block address (LBA) of the non-volatile memory 239 and the recovery policy are indicated as the second policy in the hash value table 232, the monitoring controller 231 may read original sensitive data based on the logical block address (LBA) of the stored non-volatile memory 239 stored in the hash value table 232, and replace the falsified sensitive data of the memory device 203 with the original sensitive data. As another example, when the hash value table 232 indicates the logical block address LBA of the non-volatile memory 239 and the recovery policy as the first policy, the monitoring controller 231 may notify the host 200 of the location where the falsified sensitive data is stored and the logical block address LBA of the non-volatile memory 239. As another example, when the recovery policy is indicated as the first policy in the hash value table 232 and the logical block address LBA of the non-volatile memory 239 is not stored, the monitoring controller 231 may notify the host 200 of the location where the falsified sensitive data is stored.

The processor 233 may be configured to control the overall operation of the CXL storage device 220. The processor 233 may perform calculations on data stored in the RAM 234. The RAM 234 may be used as an operating memory or a buffer memory of the CXL storage controller 230.

The FTL 235 may perform various management operations for efficiently using the non-volatile memory 239. The ECC engine 236 may perform error detection and correction on data stored in the non-volatile memory 239.

The CXL storage interface circuit 237 may be connected to the CXL switch 210. The CXL storage interface circuit 237 may communicate with the host 200 and/or other CXL devices through the CXL switch 210. The CXL storage interface circuit 237 may include a PCIe 5.0 (or other version) architecture for the CXL.io path, and may add CXL.cache and CXL.mem paths specific to the CXL. In another example embodiment, the CXL storage interface circuit 237 can be configured to be backward compatible with the previous cache-coherency protocols such as CXL 1.1. The CXL storage interface circuit 237 may be configured to implement the CXL.io, CXL.mem and CXL.cache protocols or other suitable cache-coherency protocols. The CXL storage interface circuit 237 may be configured to support different CXL device types, such as type 1, type 2, and/or type 3 CXL devices. The CXL storage interface circuit 237 may be configured to support a PCIe protocol such as the PCIe 5.0 protocol. The CXL storage interface circuit 237 may be configured to support the PIPE 5.x protocol using any suitable PIPE interface width (e.g., 8-, 16-, 32-, 64- and 128-bit configurable PIPE interface widths). The CXL storage interface circuit 237 may be configured to support various CXL device configurations such as those illustrated and described with respect to FIG. 2.

The flash interface circuit 238 may control the non-volatile memory 239 so that data is stored in the non-volatile memory 239 or data is read from the non-volatile memory 239. In an example embodiment, the flash interface circuit 238 may be implemented to conform to standards such as Toggle Interface or ONFI.

The CXL memory device 240 may include a CXL memory controller 250 and a buffer memory 257. The CXL memory controller 250 may include a monitoring controller 252 and a hash value table 252. In addition, the CXL memory controller 250 may include a processor 253, a memory manager 254, a CXL memory interface circuit 255, and a buffer memory interface circuit 256.

Since the monitoring controller 251 and the hash value table 252 are identical to or similar to the monitoring controller 231 and the hash value table 232 of the CXL storage device 220, a description thereof will be omitted.

The CXL memory interface circuit 255 may be connected to the CXL switch 210. The CXL memory interface circuit 255 may communicate with the host 200 or the CXL storage device 220 through the CXL switch 210.

The processor 253 may be configured to control the overall operation of the CXL memory controller 250. The memory manager 254 may be configured to manage the buffer memory 257. For example, the memory manager 254 may be configured to convert a memory address (e.g., a logical address or a virtual address) accessed from the host 200 or the CXL storage device 220 into a physical address for the buffer memory 257. In an example embodiment, the memory address may be an address for managing a storage area of the CXL memory device 240 and may be a logical address or a virtual address designated and managed by the host 200.

The buffer memory interface circuit 256 may control the buffer memory 257 so that data is stored in the buffer memory 257 or data is read from the buffer memory 257. In an example embodiment, the buffer memory interface circuit 256 may be implemented to conform to standards such as a DDR interface and an LPDDR interface. The buffer memory 257 may store data or output the stored data under the control of the CXL memory controller 250.

Hereinafter, a data monitoring method of the CXL devices 220 and 240 will be described with reference to FIG. 3.

Figure 3:
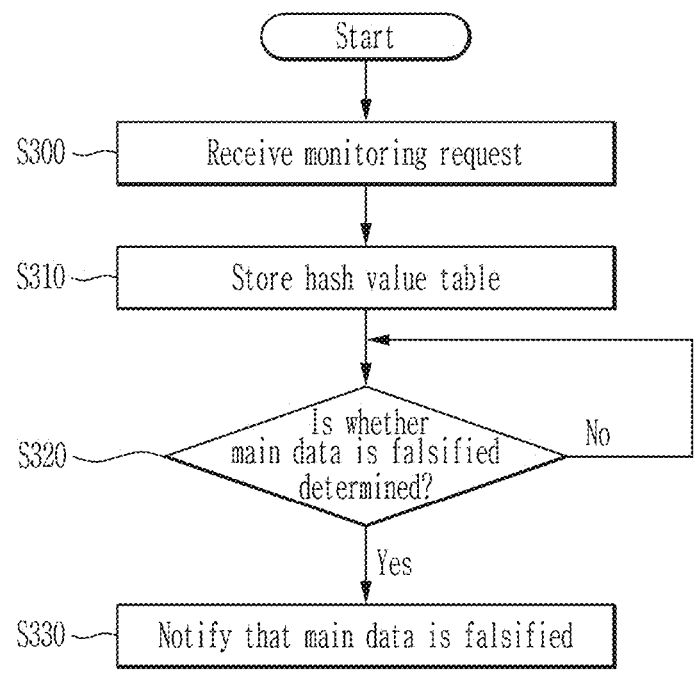
FIG. 3 is a flowchart illustrating a data monitoring method according to an example embodiment.

FIG. 3 is a flowchart illustrating a data monitoring method according to an example embodiment.

The CXL devices 220 and 240 receive a monitoring request from the host 200 (S300). The host 200 may transmit a monitoring request including the information on the secured area 204 of the memory device 203 to at least one of the CXL devices 220 and 240.

The CXL devices 220 and 240 may store a hash value table based on the monitoring request. The CXL devices 220 and 240 may read sensitive data within the secured area 204 of the memory device 203 based on the information on the secured area 204 of the monitoring request. For example, the CXL devices 220 and 240 may receive a monitoring request including a start address and length information indicating a location of sensitive data in the memory device 203, and read the sensitive data from the memory device 203. In some example embodiments, the CXL devices 220 and 240 may access the memory device 203 through the CXL.cache protocol and read sensitive data from the memory device 203. The CXL devices 220 and 240 may perform a hash operation on the read sensitive data, and associate the hash value of the sensitive data with the information indicating the location of the sensitive data in the secured area 204 to store the information. The hash value of the sensitive data and the information indicating the location of the sensitive data in the secured area 204 may be stored as a hash value table.

The CXL devices 220 and 240 determine whether the sensitive data is falsified (S320). The CXL devices 220 and 240 may read the sensitive data stored in the memory device 203 based on the position of the sensitive data in the secured area 204 of the hash value table. The CXL devices 220 and 240 may perform the hash operation on the read sensitive data. The CXL devices 220 and 240 may determine whether the sensitive data in the secured area 204 has been falsified by comparing the hash value calculated through the hash operation with the hash value of the sensitive data stored in the hash value table. The CXL devices 220 and 240 may determine that the sensitive data is not falsified when the two hash values match, and determine that the sensitive data is falsified when the two hash values are different.

When it is determined that the sensitive data is falsified, the CXL devices 220 and 240 notify the host 200 that the sensitive data is falsified (S330). The CXL devices 220 and 240 may notify the host 200 of the information on the location of the falsified sensitive data by referring to the hash value table. The host 200 may recover falsified sensitive data as the original sensitive data. In some example embodiments, the CXL devices 220 and 240 may recover the falsified sensitive data as the original sensitive data without notifying the host 200 that the sensitive data has been falsified. In this case, the hash value table may store the information on the location of the original sensitive data together (e.g., describing storage or storing of the original sensitive data), and the CXL devices 220 and 240 read the original sensitive data from the non-volatile memory 239 or the buffer memory 257 based on the hash value table. The CXL devices 220 and 240 may store the read original sensitive data in the location of the falsified sensitive data in the memory device 203.

According to an example embodiment, the data integrity may be checked only by the CXL devices 220 and 240 without the intervention of the host 200. There is an effect of reducing the power consumption for checking the data integrity. Also, since the separate hardware for checking the data integrity is not required, manufacturing costs may be reduced. In addition, since the CXL devices 220 and 240 are separate components from the host 200, the risk of external attacks may be reduced.

Figure 4:
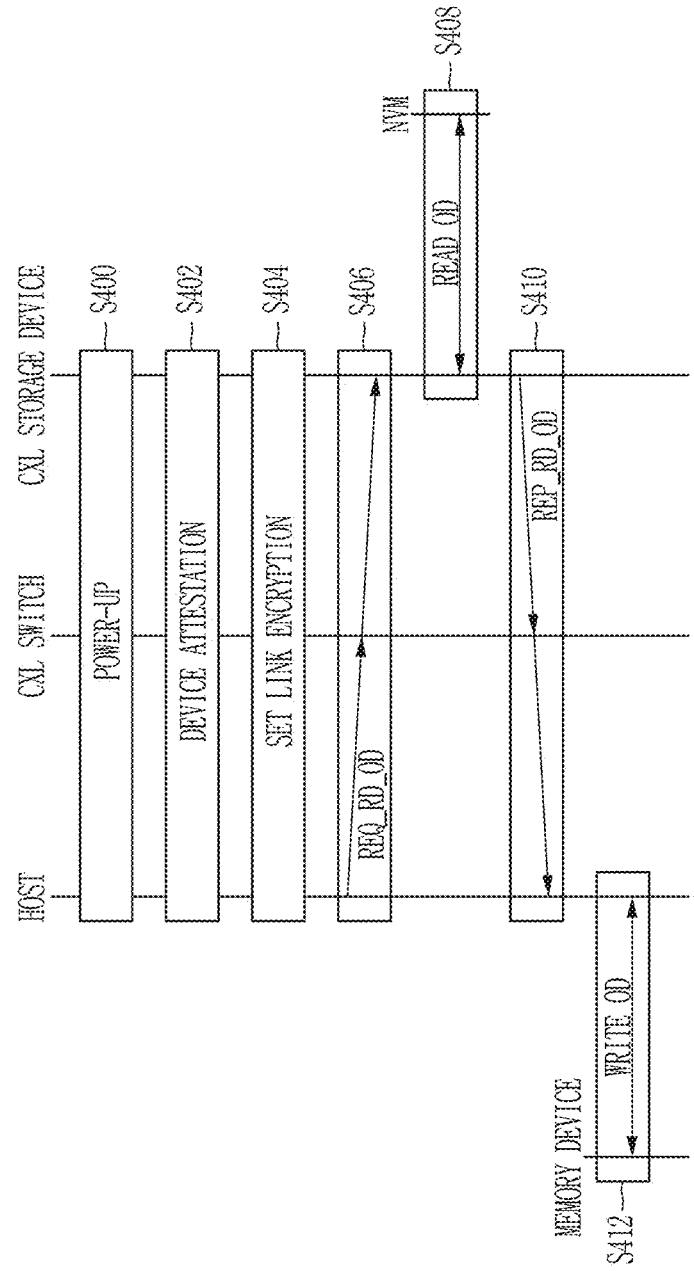
FIG. 4 is a flowchart illustrating an initial setting operation between a host and a CXL storage device according to an example embodiment.

FIG. 4 is a flowchart illustrating an initial setting operation between a host and a CXL storage device according to an example embodiment.

Referring to FIG. 4, the host 200, the CXL switch 205, and the CXL storage device 220 are powered up (S400). The host 200 may transmit power-up or initialization start information to the CXL storage device 220 and the CXL switch 205. In response to the information on the power-up or initialization start, each of (or alternatively, at least one of) the CXL storage device 220 and the CXL switch 205 may perform an individual initialization operation.

The host 200 performs attestation between devices (S402). In some example embodiments, the host 200 may request versions and specifications of the CXL storage device 220 from the CXL storage device 220. The CXL storage device 220 may transmit the versions and specifications used by the CXL storage device 220 upon request. The host 200 may determine an algorithm to be used by checking an encryption algorithm commonly used by the host 200 and the CXL storage device 220 based on the received versions and specifications.

The host 200 performs CXL link encryption (S404). In some example embodiments, when the device attestation is performed, the host 200 may configure the CXL.io IDE key and the CXL.cachemem IDE key with the CXL storage device 220 through the secure channel using the encryption algorithm.

The host 200 issues a read request REQ_RD_OD to the CXL storage device 220 through the CXL host interface circuit 201 (S406). The read request REQ_RD_OD may be transmitted to the CXL switch 205. The CXL switch 205 may transmit the read request REQ_RD_OD to the CXL storage device 220 that is the target of the read request REQ_RD_OD. In some example embodiments, the read request REQ_RD_OD may be a request for reading the sensitive data stored in the CXL storage device 220 and may include the logical block address corresponding to the sensitive data.

The CXL storage device 220 reads sensitive data OD in response to the read request REQ_RD_OD (S408). For example, the CXL storage controller 230 of the CXL storage device 220 may read the sensitive data OD from an area corresponding to the address (e.g., a logical block address or a virtual address) included in the read request REQ_RD_OD. In an example embodiment, the CXL storage controller 230 may read the sensitive data OD from the non-volatile memory 239 using the flash interface circuit 238.

The CXL storage device 220 issues a read response REP_RD_OD including the sensitive data OD through the CXL storage interface circuit 237 (S410). The CXL switch 210 may transmit the read response REP_RD_OD to the host 200.

The host 200 writes the sensitive data OD included in the read response REP_RD_OD into the memory device 203 (S412). In an example embodiment, the host 200 may store the sensitive data OD in the secured area 204 of the memory device 203.

Figure 5:
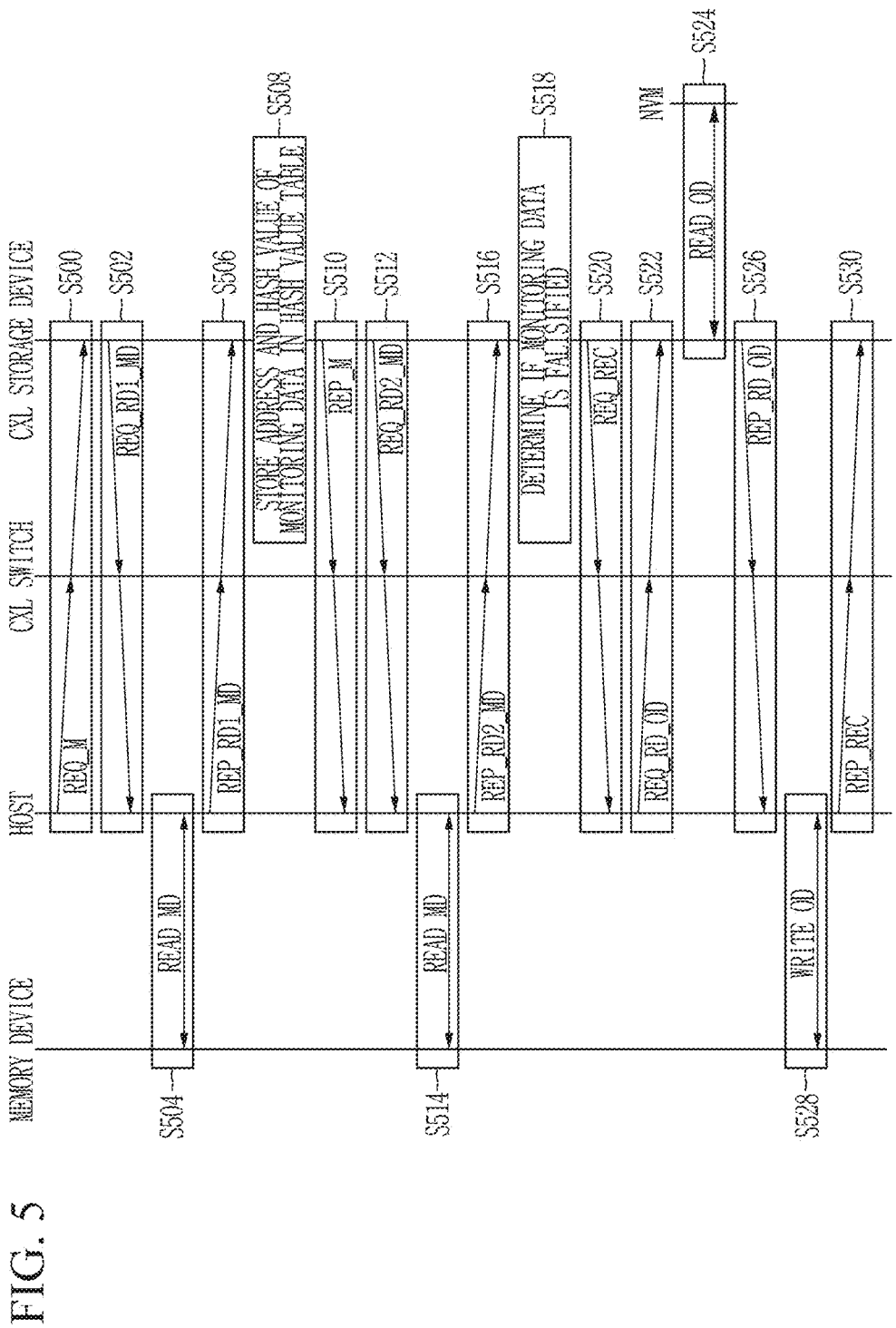
FIG. 5 is a flowchart illustrating a data recovery operation between the host and the CXL storage device according to an example embodiment.

FIG. 5 is a flowchart illustrating a data recovery operation between the host and the CXL storage device according to an example embodiment.

Referring to FIG. 5, the host 200 issues a monitoring request REQ_M to the CXL storage device 220 through the CXL host interface circuit 201 (S500). The monitoring request REQ_M may be transmitted to the CXL switch 205. The CXL switch 205 may transmit the monitoring request REQ_M to the CXL storage device 220 that is the target of the monitoring request REQ_M. In some example embodiments, the monitoring request REQ_M may be a request for monitoring whether the sensitive data MD stored in the memory device 203 is falsified, and may include information on a location where the sensitive data MD is stored.

The CXL storage device 220 issues a first read request REQ_RD1_MD through the CXL storage interface circuit 237 in response to the monitoring request REQ_M (S502). The first read request REQ_RD1_MD may be transmitted to the CXL switch 205. The CXL switch 205 may transmit the first read request REQ_RD1_MD to the host 200 that is the target of the first read request REQ_RD1_MD. In some example embodiments, the first read request REQ_RD1_MD may be a request for reading the sensitive data MD stored in the memory device 204, and the sensitive data MD included in the monitoring request REQ_M may include the information on the stored location. For example, the first read request REQ_RD1_MD may include the start address and the length information indicating the location of the sensitive data MD in the memory device 203.

The host 200 reads the sensitive data MD in response to the first read request REQ_RD1_MD (S504). For example, the memory controller 202 of the host 200 may read the sensitive data MD from the area corresponding to the start address included in the first read request REQ_RD1_MD. In an example embodiment, the memory controller 202 may read the sensitive data MD from the secured area 204 of the memory device 203.

The host 200 issues a first read response REP_RD1_MD including the sensitive data MD through the CXL host interface circuit 201 (S506). The CXL switch 210 may transmit the first read response REP_RD1_MD to the CXL storage device 220.

The CXL storage device 220 stores the hash value of the sensitive data MD and the information on the location where the sensitive data MD is stored as the hash value table 232 (S508). The CXL storage device 220 may perform a hash operation on the sensitive data MD included in the first read response REP_RD1_MD. The CXL storage device 220 may associate the hash value of the sensitive data MD with information on a location where the sensitive data is stored to store the information as the hash value table 232. The hash value table 232 will be described together with reference to FIG. 6.

FIG. 6 is a diagram illustrating the hash value table of the CXL storage device according to an example embodiment.

Referring to FIG. 6, the hash value table 600 may include the information (to-be monitored address) on the location where sensitive data MD is stored and the hash value (hash value of monitoring data) of the sensitive data MD. The hash value table 600 may include addresses ADDR1, ADDR2, . . . , ADDRn and hash values HASH1, HASH2, . . . , HASHn of sensitive data MD1, MD2, . . . , MDn. In some example embodiments, the hash value table 600 may further include information on a monitoring interval. The monitoring intervals for the sensitive data MD1, MD2, . . . , MDn may be different as T1, T2, . . . , Tn. The host 200 may generate the monitoring request REQ_M by further including the information on the monitoring interval in the monitoring request REQ_M. The hash value table 600 may further include the length information indicating the location of the sensitive data MD1, MD2, . . . , MDn in addition to the addresses ADDR1, ADDR2, . . . , ADDRn of the sensitive data MD1, MD2, . . . , MDn.

The CXL storage device 220 issues a monitoring response REP_M through the CXL storage interface circuit 237 (S510). The CXL switch 210 may transmit the monitoring response REP_M to the host 200.

The CXL storage device 220 issues a second read request REQ_RD2_MD through the CXL storage interface circuit 237 by referring to the hash value table 232 (S512). The second read request REQ_RD2_MD may be transmitted to the CXL switch 205. The CXL switch 205 may transmit the second read request REQ_RD2_MD to the host 200 that is the target of the second read request REQ_RD2_MD. In some example embodiments, the second read request REQ_RD2_MD may be a request for reading the sensitive data MD stored in the memory device 204, and may include information on a location where the sensitive data MD included in the hash value table 232 is stored. For example, the second read request REQ_RD2_MD may include the start address and the length information indicating the location of the sensitive data MD in the memory device 203.

In an example embodiment, the CXL storage device 220 may issue the second read request REQ_RD2_MD by referring to the monitoring interval of the hash value table 232. The CXL storage device 220 may issue the second read request REQ_RD2_MD for each sensitive data MD1, MD2, . . . , MDn in FIG. 6 according to the monitoring interval T1, T2, . . . , Tn of each sensitive data MD1, MD2, . . . , MDn. For example, when the monitoring interval T1 is shorter than the monitoring interval T2, the second read request REQ_RD2_MD for sensitive data MD1 is issued more frequently than the second read request REQ_RD2_MD for sensitive data MD2.

The host 200 reads the sensitive data MD in response to the second read request REQ_RD2_MD (S514). For example, the memory controller 202 of the host 200 may read the sensitive data MD from the area corresponding to the start address included in the second read request REQ_RD2_MD. In an example embodiment, the memory controller 202 may read the sensitive data MD from the secured area 204 of the memory device 203.

The host 200 issues a second read response REP_RD2_MD including the sensitive data MD through the CXL host interface circuit 201 (S516). The CXL switch 210 may transmit the second read response REP_RD2_MD to the CXL storage device 220.

The CXL storage device 220 determines whether the sensitive data MD in the memory device 203 is falsified (S518). The CXL storage device 220 may compare the hash value of the sensitive data MD included in the second read response REP_RD2_MD with the hash value stored in the hash value table 232 to determine whether the sensitive data MD in the memory device 203 is falsified.

When it is determined that the sensitive data MD in the memory device 203 is falsified, the CXL storage device 220 issues a recovery request REQ_REC to the host 200 through the CXL storage interface 237 (S520). The recovery request REQ_REC may be transmitted to the CXL switch 205. The CXL switch 205 may transmit the recovery request REQ_REC to the host 200 that is the target of the recovery request REQ_REC. In some example embodiments, the recovery request REQ_REC may be a request for replacing the sensitive data MD stored in the memory device 203 with sensitive data OD, and may include information on a location where the falsified sensitive data MD is stored.

The host 200 issues a third read request REQ_RD_OD through the CXL host interface circuit 201 in response to the recovery request REQ_REC (S522). The third read request REQ_RD_OD may be transmitted to the CXL switch 205. The CXL switch 205 may transmit the third read request REQ_RD_OD to the CXL storage device 220 that is the target of the third read request REQ_RD_OD. The third read request REQ_RD_OD may include a logical block address corresponding to falsified sensitive data. The host 200 may check the logical block address corresponding to the falsified sensitive data based on the information on the location where the falsified sensitive data MD included in the recovery request REQ_REC is stored.

The CXL storage device 220 reads sensitive data OD in response to the third read request REQ_RD_OD (S524). For example, the CXL storage controller 230 of the CXL storage device 220 may read sensitive data OD from an area corresponding to an address included in the third read request REQ_RD_OD of the non-volatile memory 239.

The CXL storage device 220 issues the third read response REP_RD_OD including the sensitive data OD through the CXL storage interface circuit 237 (S526). The CXL switch 210 may transmit the third read response (REP_RD_OD) to the host 200.

The host 200 writes the sensitive data OD included in the third read response REP_RD_OD to the memory device 203 (S528). In an example embodiment, the host 200 may replace and store the sensitive data OD in the location where the falsified sensitive data MD is stored in the memory device 203.

The host 200 issues a recovery response REP_REC indicating that recovery has been completed through the CXL host interface circuit 201 (S530). When the writing of the sensitive data OD into the memory device 203 is completed, the host 200 may issue a recovery response REP_REC.

Figure 7:
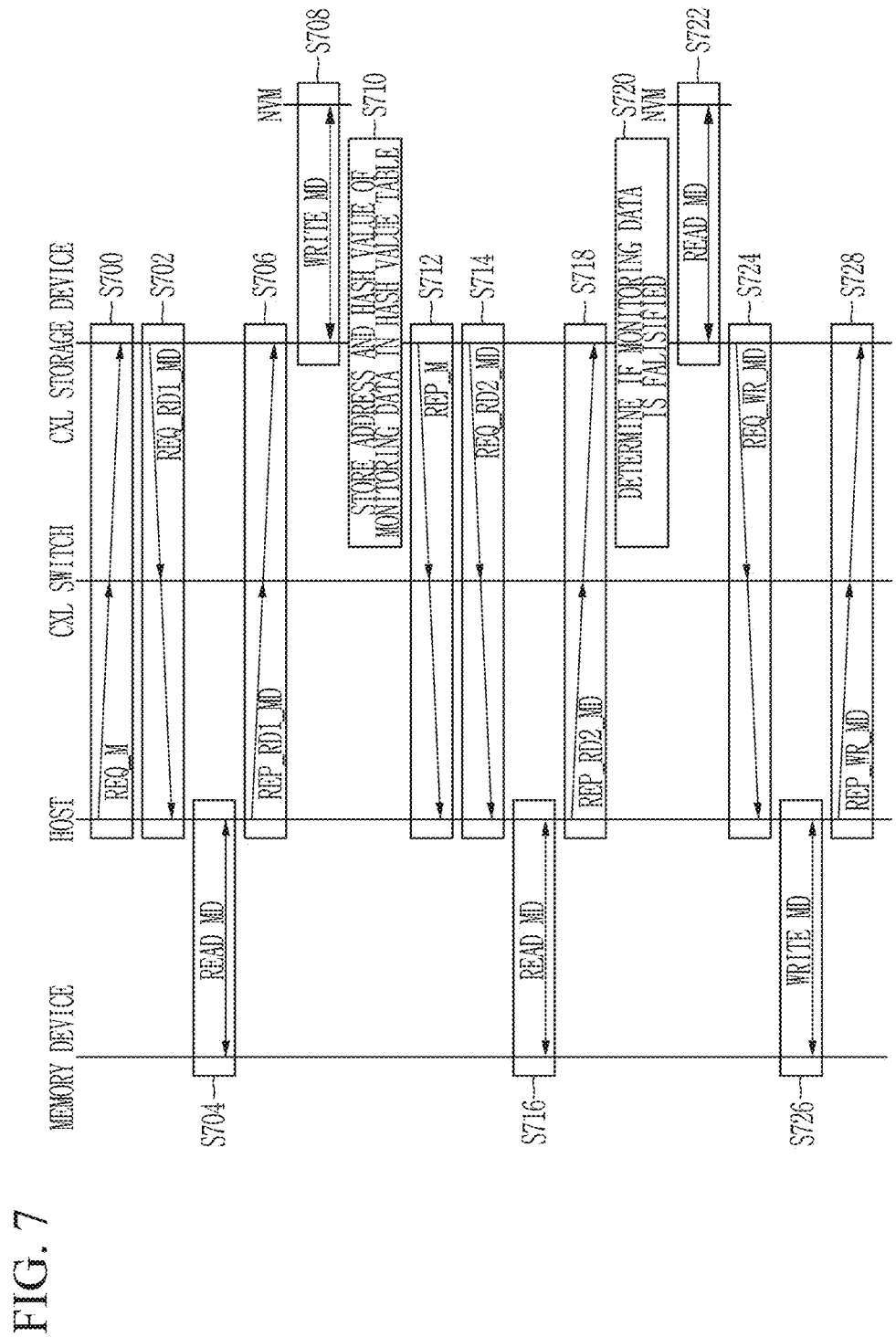
FIG. 7 is a flowchart illustrating the data recovery operation between the host and the CXL storage device according to an example embodiment.

FIG. 7 is a flowchart illustrating the data recovery operation between the host and the CXL storage device according to an example embodiment.

Among the steps of FIG. 7, descriptions of steps identical to or similar to some of the steps of FIG. 5 are omitted.

Referring to FIG. 7, the host 200 issues a monitoring request (REQ_M) to the CXL storage device 220 through the CXL host interface circuit 201 (S700).

The CXL storage device 220 issues a first read request REQ_RD1_MD through the CXL storage interface circuit 237 in response to the monitoring request REQ_M (S702).

The host 200 reads the sensitive data MD in response to the first read request REQ_RD1_MD (S704).

The host 200 issues a first read response REP_RD1_MD including the sensitive data MD through the CXL host interface circuit 201 (S706).

The CXL storage device 220 writes the sensitive data MD into the non-volatile memory 239 (S708). In an example embodiment, the CXL storage device 220 may write the sensitive data MD into the non-volatile memory 239 using the flash interface circuit 238.

The CXL storage device 220 stores the hash value of the sensitive data MD, the information on the location where the sensitive data MD is stored in the memory device 203, and the information on the location where the sensitive data MD is stored in the non-volatile memory 239 as the hash value table 232 (S710). The CXL storage device 220 may perform a hash operation on sensitive data MD. The CXL storage device 220 may associate the hash value with the information on the location where the sensitive data of each of (or alternatively, at least one of) the memory device 203 and the non-volatile memory 239 are stored to store the information as the hash value table 232. The hash value table 232 will be described together with reference to FIG. 8.

FIG. 8 is a diagram illustrating the hash value table of the CXL storage device according to an example embodiment.

Referring to FIG. 8, a hash value table 800 may include information on the location where the sensitive data MD to be monitored is stored (to-be monitored address), the hash value of the sensitive data MD (hash value of monitoring data), and a logical block address (address of monitoring data) of the sensitive data MD in the non-volatile memory 239. Specifically, the hash value table 800 may include addresses ADDR1, ADDR2, . . . , ADDRn, in the memory device 203 of sensitive data MD1, MD2, . . . , MDn, addresses LBA1, LBA2, . . . , LBAn in the non-volatile memory 239, and hash values HASH1, HASH2, . . . , HASHn. In some example embodiments, the hash value table 800 may further include information on a monitoring interval. The monitoring intervals for the sensitive data MD1, MD2, . . . , MDn may be different as T1, T2, . . . , Tn. The host 200 may generate the monitoring request REQ_M by further including the information on the monitoring interval in the monitoring request REQ_M.

The CXL storage device 220 issues a monitoring response REP_M through the CXL storage interface circuit 237 (S712). The CXL switch 210 may transmit the monitoring response REP_M to the host 200.

The CXL storage device 220 issues a second read request REQ_RD2_MD through the CXL storage interface circuit 237 by referring to the hash value table 232 (S714). In an example embodiment, the CXL storage device 220 may issue the second read request REQ_RD2_MD by referring to the monitoring interval of the hash value table 232.

The host 200 reads the sensitive data MD in response to the second read request REQ_RD2_MD (S716).

The host 200 issues a second read response REP_RD2_MD including the sensitive data MD through the CXL host interface circuit 201 (S718).

The CXL storage device 220 determines whether the sensitive data MD in the memory device 203 is falsified (S720).

When it is determined that the sensitive data MD in the memory device 203 is falsified, the CXL storage device 220 refers to the hash value table 232 and reads the sensitive data MD (S722). For example, the CXL storage device 220 may read the sensitive data MD from an area corresponding to an address corresponding to the falsified sensitive data MD included in the hash value table 232. In an example embodiment, the CXL storage controller 230 may read the sensitive data MD from the nonvolatile memory 239 using the flash interface circuit 238.

The CXL storage device 220 issues a write request REQ_WR_MD including sensitive data MD through the CXL storage interface circuit 237 (S724). The CXL switch 210 may transmit the write request REQ_WR_MD to the host 200.

The host 200 writes the sensitive data MD included in the write request REQ_WR_MD to the memory device 203 (S726). In an example embodiment, the host 200 may replace and store the sensitive data MD in the location where the falsified sensitive data MD is stored in the memory device 203.

The host 200 issues a write response REP_WR_MD indicating that the writing of the sensitive data MD has been completed through the CXL host interface circuit 201 (S728). When the writing of the sensitive data MD into the memory device 203 is completed, the host 200 may issue a write response REP_WR_MD.

Figure 9:
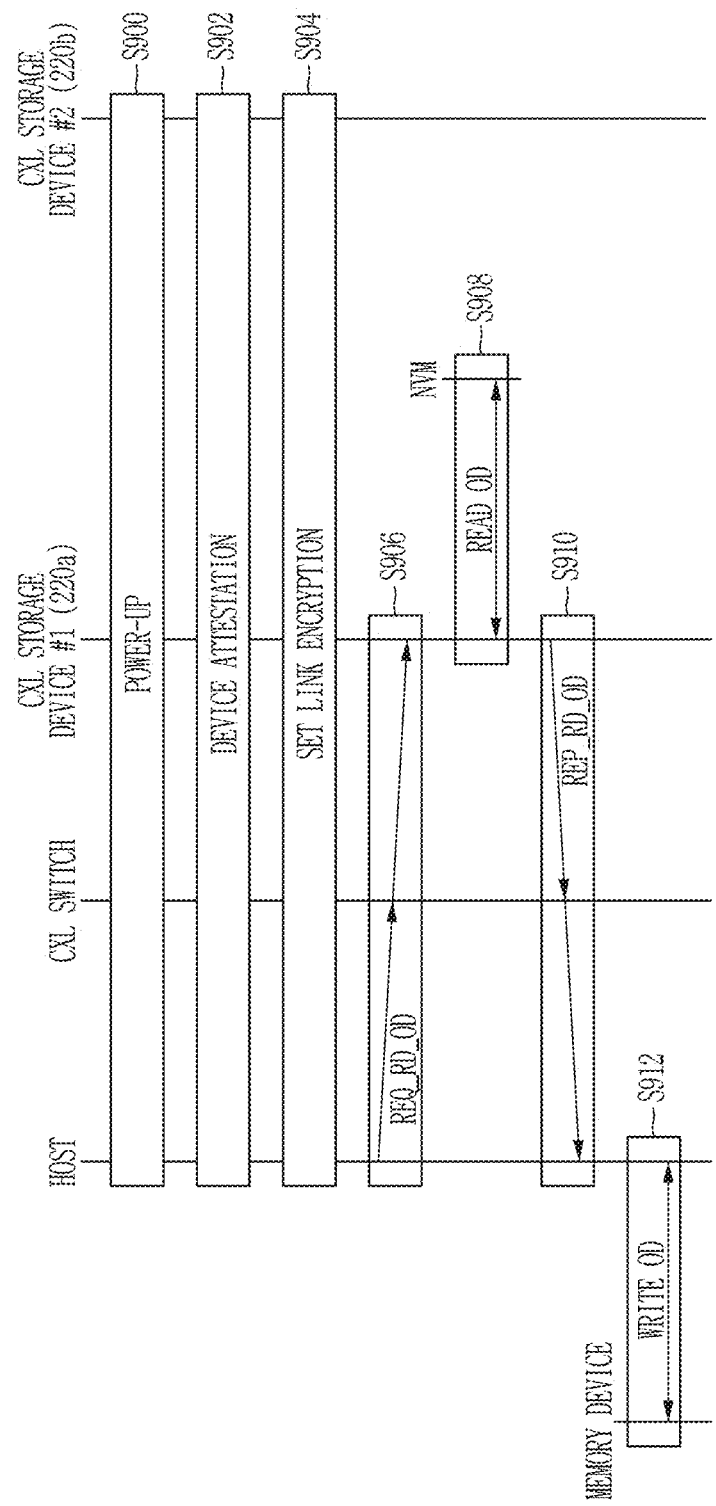
FIG. 9 is a flowchart illustrating the initial setting operation between the host and the CXL storage devices according to an example embodiment.

FIG. 9 is a flowchart illustrating the initial setting operation between the host and the CXL storage devices according to an example embodiment.

Referring to FIG. 9, the host 200, the CXL switch 205, a first CXL storage device 220a, and a second CXL storage device 220b are powered up (S900). The host 200 may transmit power-up or initialization start information to the CXL storage devices 220a and 220b and the CXL switch 205. In response to the information on the power-up or initialization start, each of (or alternatively, at least one of) the CXL storage devices 220a and 220b and the CXL switch 205 may perform an individual initialization operation.

The host 200 performs attestation between devices (S902). In some example embodiments, the host 200 may request versions and specifications of the CXL storage devices 220a and 220b from the CXL storage device 220. Each of (or alternatively, at least one of) the CXL storage devices 220a, and 220b may transmit the versions and specifications used by the CXL storage devices 220a, and 220b upon request. The host 200 may determine an algorithm to be used by checking an encryption algorithm commonly used by the host 200 and each of (or alternatively, at least one of) the CXL storage devices 220a and 220b based on the received versions and specifications.

The host 200 performs CXL link encryption (S904). In some example embodiments, when the device attestation is performed, the host 200 may configure the CXL.io IDE key and the CXL.cachemem IDE key with each of (or alternatively, at least one of) the CXL storage devices 220a and 220b through the secure channel using the encryption algorithm.

The host 200 issues the read request REQ_RD_OD to the first CXL storage device 220a through the CXL host interface circuit 201 (S906). The read request REQ_RD_OD may be transmitted to the CXL switch 205. The CXL switch 205 may transmit the read request REQ_RD_OD to the first CXL storage device 220a that is the target of the read request REQ_RD_OD. In some example embodiments, the read request REQ_RD_OD may be a request for reading the sensitive data stored in the first CXL storage device 220a and may include the logical block address corresponding to the sensitive data.

The first CXL storage device 220a reads sensitive data OD in response to the read request REQ_RD_OD (S908).

The first CXL storage device 220a issues the read response REP_RD_OD including the sensitive data OD (S910). The CXL switch 210 may transmit the read response (REP_RD_OD) to the host 200.

The host 200 writes the sensitive data OD included in the read response REP_RD_OD into the memory device 203 (S912). In an example embodiment, the host 200 may store the sensitive data OD in the secured area 204 of the memory device 203.

Figure 10:
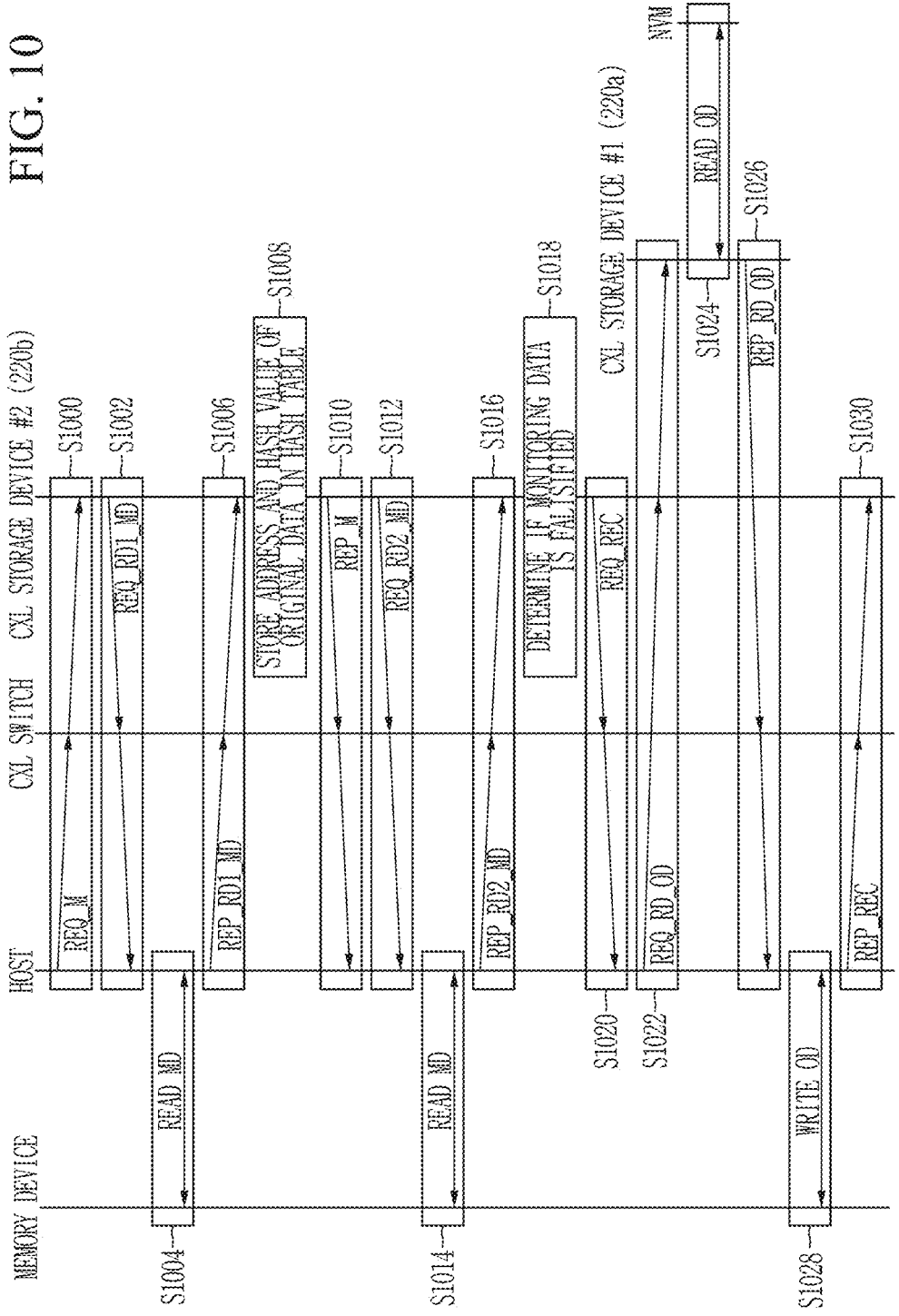
FIG. 10 is a flowchart illustrating the data recovery operation between the host and the CXL storage devices according to an example embodiment.

FIG. 10 is a flowchart illustrating the data recovery operation between the host and the CXL storage devices according to an example embodiment.

Referring to FIG. 10, the host 200 issues a monitoring request (REQ_M) to the second CXL storage device 220*b* through the CXL host interface circuit 201 (S1000).

The second CXL storage device 220*b* issues the first read request REQ_RD1_MD in response to the monitoring request REQ_M (S1002).

The host 200 reads the sensitive data MD in response to the first read request REQ_RD1_MD (S1004).

The host 200 issues the first read response REP_RD1_MD including the sensitive data MD through the CXL host interface circuit 201 (S1006).

The second CXL storage device 220*b* stores the hash value of the sensitive data MD and the information on the location where the sensitive data MD is stored as the hash value table 232 (S1008).

The second CXL storage device 220*b* issues the monitoring response REP_M through the CXL storage interface circuit (S1010). The CXL switch 210 may transmit the monitoring response REP_M to the host 200.

The second CXL storage device 220*b* issues the second read request REQ_RD2_MD through the CXL storage interface circuit 237 by referring to the hash value table 232 (S1012). The second read request REQ_RD2_MD may be transmitted to the CXL switch 205. The CXL switch 205 may transmit the second read request REQ_RD2_MD to the host 200 that is the target of the second read request REQ_RD2_MD.

In an example embodiment, the second CXL storage device 220*b* may issue the second read request REQ_RD2_MD by referring to the monitoring interval of the hash value table 232.

The host 200 reads the sensitive data MD in response to the second read request REQ_RD2_MD (S1014).

The host 200 issues the second read response REP_RD2_MD including the sensitive data MD through the CXL host interface circuit 201 (S1016). The CXL switch 210 may transmit the second read response REP_RD2_MD to the second CXL storage device 220*b*.

The second CXL storage device 220*b* determines whether the sensitive data MD in the memory device 203 is falsified (S1018). The second CXL storage device 220*b* may compare the hash value of the sensitive data MD included in the second read response REP_RD2_MD with the hash value stored in the hash value table 232 to determine whether the sensitive data MD in the memory device 203 is falsified.

When it is determined that the sensitive data MD in the memory device 203 is falsified, the second CXL storage device 220*b* issues the recovery request REQ_REC to the host 200 (S1020). The recovery request REQ_REC may be transmitted to the CXL switch 205. The CXL switch 205 may transmit the recovery request REQ_REC to the host 200 that is the target of the recovery request REQ_REC. In some example embodiments, the recovery request REQ_REC may be a request for replacing the sensitive data MD stored in the memory device 203 with the sensitive data OD, and may include information on a location where the falsified sensitive data MD is stored.

The host 200 issues the third read request REQ_RD_OD through the CXL host interface circuit 201 in response to the recovery request REQ_REC (S1022). The third read request REQ_RD_OD may be transmitted to the CXL switch 205. The CXL switch 205 may transmit the third read request REQ_RD_OD to the first CXL storage device 220*a* that is the target of the third read request REQ_RD_OD. The third read request REQ_RD_OD may include a logical block address corresponding to falsified sensitive data. The host 200 may check the logical block address corresponding to the falsified sensitive data based on the information on the location where the falsified sensitive data MD included in the recovery request REQ_REC is stored.

The first CXL storage device 220*a* reads the sensitive data OD in response to the third read request REQ_RD_OD (S1024). For example, the first CXL storage device 220*a* may read the sensitive data OD from an area corresponding to an address included in the third read request REQ_RD_OD of the non-volatile memory NVM.

The first CXL storage device 220*a* issues the third read response REP_RD_OD including the sensitive data OD through the CXL storage interface circuit (S1026). The CXL switch 210 may transmit the third read response REP_RD_OD to the host 200.

The host 200 writes the sensitive data OD included in the third read response REP_RD_OD to the memory device 203 (S1028). In an example embodiment, the host 200 may replace and store the sensitive data OD in the location where the falsified sensitive data MD is stored in the memory device 203.

The host 200 issues the recovery response REP_REC indicating that the recovery has been completed through the CXL host interface circuit 201 (S1030). When the writing of the sensitive data OD into the memory device 203 is completed, the host 200 may issue a recovery response REP_REC.

Figure 11:
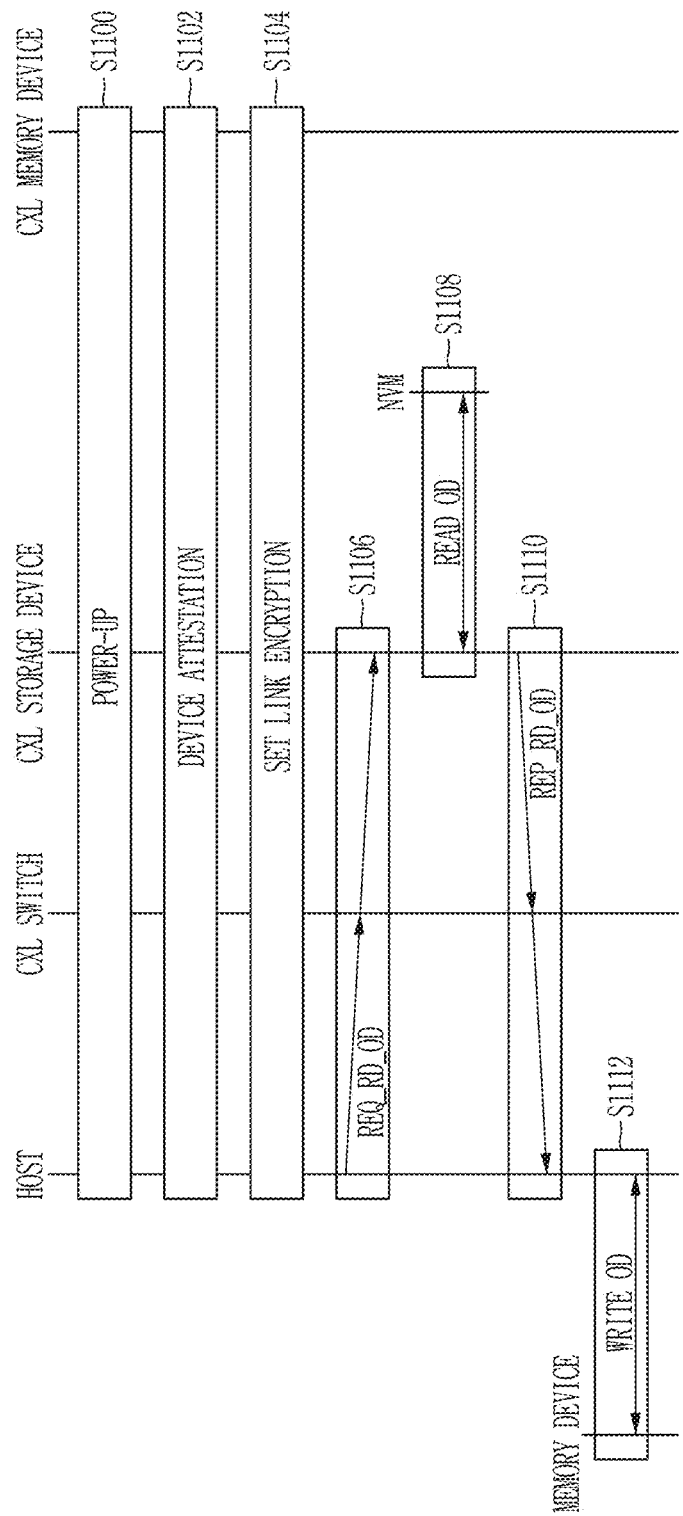
FIG. 11 is a flowchart illustrating the initial setting operation between the host and the CXL devices according to an example embodiment.

FIG. 11 is a flowchart illustrating the initial setting operation between the host and the CXL devices according to an example embodiment.

Referring to FIG. 11, the host 200, the CXL switch 205, the CXL storage device 220, and the CXL memory device 240 are powered up (S1100). The host 200 may transmit the power-up or initialization start information to the CXL storage devices 220 and 240 and the CXL switch 205. In response to the information on the power-up or initialization start, each of (or alternatively, at least one of) the CXL devices 220 and 240 and the CXL switch 205 may each perform an individual initialization operation.

The host 200 performs attestation between the devices (S1102). In some example embodiments, the host 200 may request the versions and specifications of the CXL devices 220*a* and 220*b* from the CXL devices 220 and 240. Each of (or alternatively, at least one of) the CXL devices 220 and 240 may transmit the versions and specifications used by the CXL devices 220 and 240 themselves upon request. The host 200 may determine an algorithm to be used by checking the encryption algorithm commonly used by the host 200 and each of (or alternatively, at least one of) the CXL devices 220 and 240 based on the received versions and specifications.

The host 200 performs the CXL link encryption (S1104). In some example embodiments, when the device attestation is performed, the host 200 may configure the CXL.io IDE key and the CXL.cachemem IDE key with each of (or alternatively, at least one of) the CXL devices 220 and 240 through the secure channel using the encryption algorithm.

The host 200 issues the read request REQ_RD_OD to the CXL storage device 220 through the CXL host interface circuit 201 (S1106). The read request REQ_RD_OD may be transmitted to the CXL switch 205.

The CXL storage device 220a reads the sensitive data OD in response to the read request REQ_RD_OD (S1108).

The CXL storage device 220 issues the read response REP_RD_OD including the sensitive data OD (S1110). The CXL switch 210 may transmit the read response REP_RD_OD to the host 200.

The host 200 writes the sensitive data OD included in the read response REP_RD_OD into the memory device 203 (S1112). In an example embodiment, the host 200 may store the sensitive data OD in the secured area 204 of the memory device 203.

Figure 12:
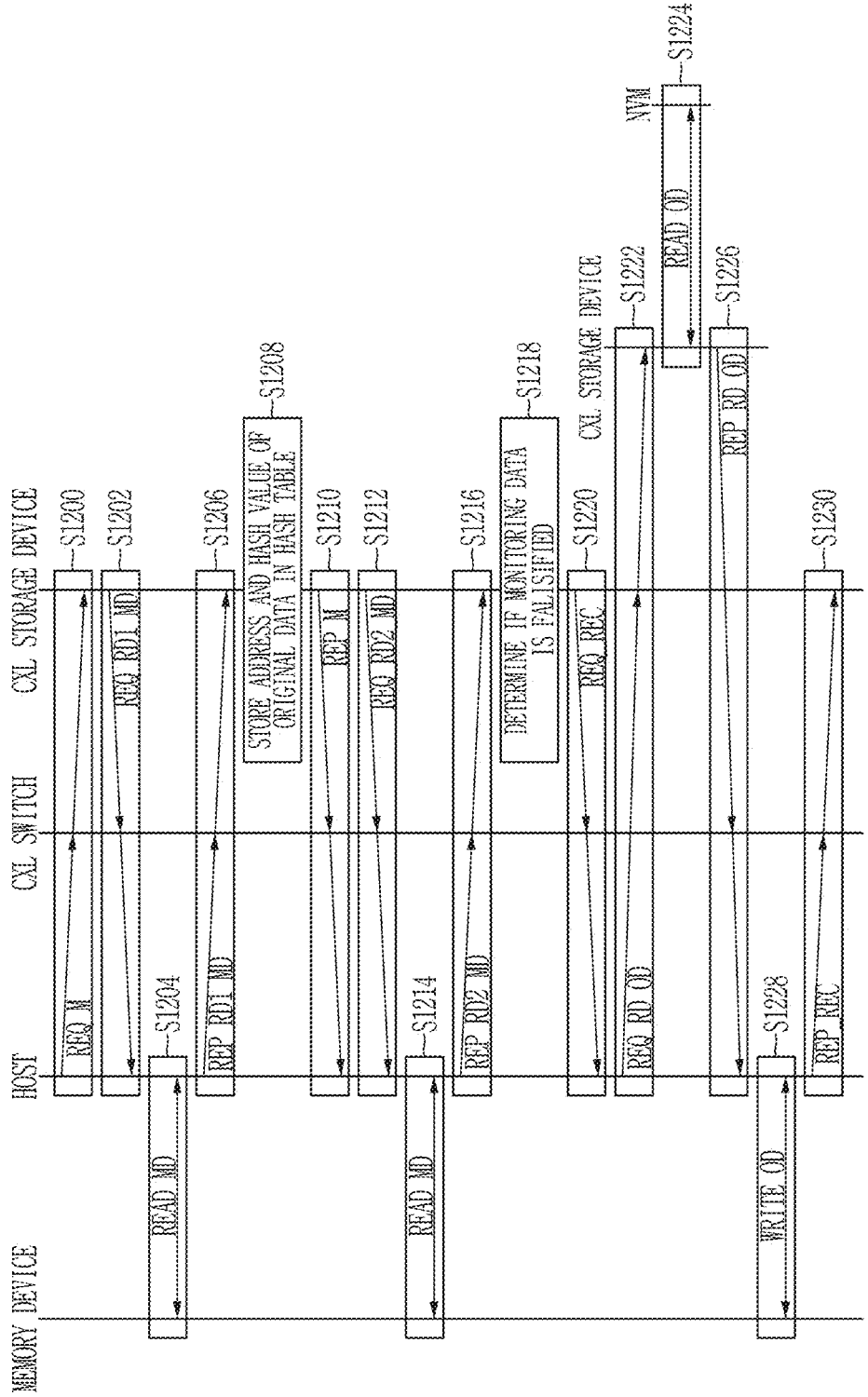
FIG. 12 is a flowchart illustrating the data recovery operation between the host and the CXL devices according to an example embodiment.

FIG. 12 is a flowchart illustrating the data recovery operation between the host and the CXL devices according to an example embodiment.

Referring to FIG. 12, the host 200 issues the monitoring request REQ_M to the CXL memory device 240 through the CXL host interface circuit 201 (S1200).

The CXL memory device 240 issues the first read request REQ_RD1_MD in response to the monitoring request REQ_M (S1202).

The host 200 reads the sensitive data MD in response to the first read request REQ_RD1_MD (S1204).

The host 200 issues the first read response REP_RD1_MD including the sensitive data MD through the CXL host interface circuit 201 (S1206).

The CXL memory device 240 stores the hash value of the sensitive data MD and the information on the location where the sensitive data MD is stored as the hash value table 232 (S1208).

The CXL memory device 240 issues the monitoring response REP_M through the CXL memory interface circuit 255 (S1210). The CXL switch 210 may transmit the monitoring response REP_M to the host 200.

The CXL memory device 240 issues the second read request REQ_RD2_MD through the CXL memory interface circuit 255 by referring to the hash value table 232 (S1212). The second read request REQ_RD2_MD may be transmitted to the CXL switch 205. The CXL switch 205 may transmit the second read request REQ_RD2_MD to the host 200 that is the target of the second read request REQ_RD2_MD.

In an example embodiment, the CXL memory device 240 may issue the second read request REQ_RD2_MD by referring to the monitoring interval of the hash value table 232.

The host 200 reads the sensitive data MD in response to the second read request REQ_RD2_MD (S1214).

The host 200 issues the second read response REP_RD2_MD including the sensitive data MD through the CXL host interface circuit 201 (S1216). The CXL switch 210 may transmit the second read response REP_RD2_MD to the CXL memory device 240.

The CXL memory device 240 determines whether the sensitive data MD in the memory device 203 is falsified (S1218). The CXL memory device 240 may compare the hash value of the sensitive data MD included in the second read response REP_RD2_MD with the hash value stored in the hash value table 232 to determine whether the sensitive data MD in the memory device 203 is falsified.

When it is determined that the sensitive data MD in the memory device 203 is falsified, the CXL memory device 240 issues the recovery request REQ_REC to the host 200 (S1220). The recovery request REQ_REC may be transmitted to the CXL switch 205. The CXL switch 205 may transmit the recovery request REQ_REC to the host 200 that is the target of the recovery request REQ_REC. In some example embodiments, the recovery request REQ_REC may be a request for replacing the sensitive data MD stored in the memory device 203 with the sensitive data OD, and may include information on a location where the falsified sensitive data MD is stored.

The host 200 issues a third read request REQ_RD_OD through the CXL host interface circuit 201 in response to the recovery request REQ_REC (S1222). The third read request REQ_RD_OD may be transmitted to the CXL switch 205. The CXL switch 205 may transmit the third read request REQ_RD_OD to the CXL storage device 220 that is the target of the third read request REQ_RD_OD. The third read request REQ_RD_OD may include a logical block address corresponding to falsified sensitive data. The host 200 may check the logical block address corresponding to the falsified sensitive data based on the information on the location where the falsified sensitive data MD included in the recovery request REQ_REC is stored.

The CXL storage device 220 reads sensitive data OD in response to the third read request REQ_RD_OD (S1224). For example, the CXL storage device 220 may read the sensitive data OD from an area corresponding to an address included in the third read request REQ_RD_OD of the non-volatile memory NVM.

The CXL storage device 220 issues the third read response REP_RD_OD including the sensitive data OD through the CXL storage interface circuit 237 (S1226). The CXL switch 210 may transmit the third read response REP_RD_OD to the host 200.

The host 200 writes the sensitive data OD included in the third read response REP_RD_OD to the memory device 203 (S1228). In an example embodiment, the host 200 may replace and store the sensitive data OD in the location where the falsified sensitive data MD is stored in the memory device 203.

The host 200 issues the recovery response REP_REC indicating that the recovery has been completed through the CXL host interface circuit 201 (S1230). When the writing of the sensitive data OD into the memory device 203 is completed, the host 200 may issue a recovery response REP_REC.

Figure 13:
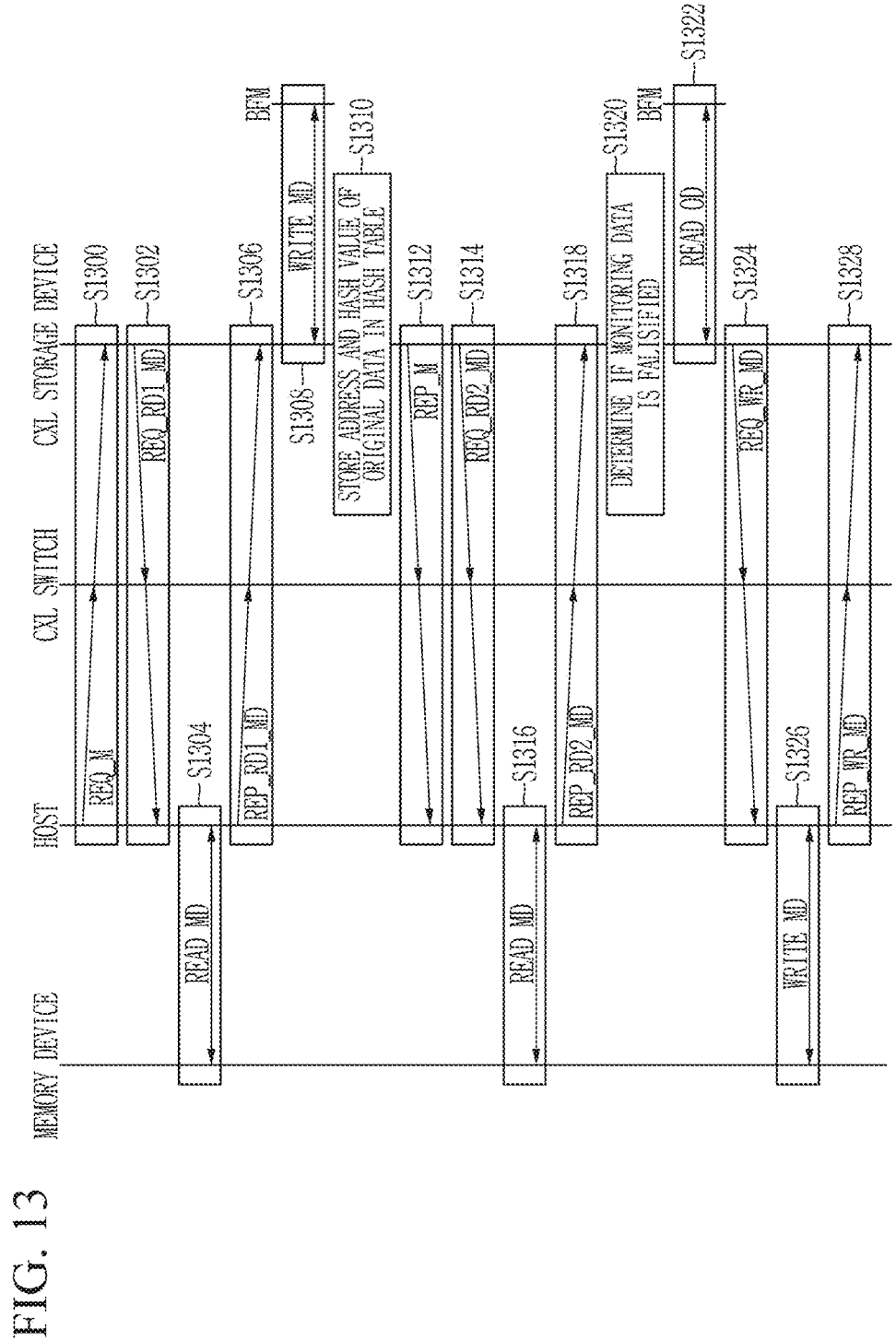
FIG. 13 is a flowchart illustrating a data recovery operation between the host and a CXL memory device according to an example embodiment.

FIG. 13 is a flowchart illustrating a data recovery operation between the host and a CXL memory device according to an example embodiment.

Referring to FIG. 13, the host 200 issues the monitoring request REQ_M to the CXL memory device 240 through the CXL host interface circuit 201 (S1300).

The CXL memory device 240 issues the first read request REQ_RD1_MD through the CXL memory interface circuit 255 in response to the monitoring request REQ_M (S1302).

The host 200 reads the sensitive data MD in response to the first read request REQ_RD1_MD (S1304).

The host 200 issues the first read response REP_RD1_MD including the sensitive data MD through the CXL host interface circuit 201 (S1306).

The CXL memory device 240 writes the sensitive data MD into the buffer memory 257 (S1308). In an example embodiment, the CXL memory device 240 may write the sensitive data MD into the buffer memory 257 using the buffer memory interface circuit 256.

The CXL memory device 240 stores the hash value of the sensitive data MD, the information on the location where the sensitive data MD is stored in the memory device 203, and the information on the location where the sensitive data MD is stored in the buffer memory 257 as the hash value table 232 (S1310). The CXL memory device 240 may perform the hash operation on the sensitive data MD. The CXL memory device 240 may associate the hash value of the sensitive data MD with the information on the location where the sensitive data of each of (or alternatively, at least one of) the memory device 203 and the buffer memory 257 is stored to store the information as the hash value table 232.

The CXL memory device 240 issues the monitoring response REP_M through the CXL memory interface circuit 255 (S1312). The CXL switch 210 may transmit the monitoring response REP_M to the host 200.

The CXL memory device 240 issues the second read request REQ_RD2_MD through the CXL memory interface circuit 255 by referring to the hash value table 232 (S1314). In an example embodiment, the CXL memory device 240 may issue the second read request REQ_RD2_MD by referring to the monitoring interval of the hash value table 232.

The host 200 reads the sensitive data MD in response to the second read request REQ_RD2_MD (S1316).

The host 200 issues the second read response REP_RD2_MD including the sensitive data MD through the CXL host interface circuit 201 (S1318).

The CXL memory device 240 determines whether the sensitive data MD in the memory device 203 is falsified (S1320).

When it is determined that the sensitive data MD in the memory device 203 is falsified, the CXL memory device 240 refers to the hash value table 232 and reads the sensitive data MD (S1322). For example, the CXL memory device 240 may read the sensitive data MD from an area corresponding to an address corresponding to the falsified sensitive data MD included in the hash value table 232. In an example embodiment, the CXL memory controller 250 may read the sensitive data MD from the buffer memory 257 using the buffer memory interface circuit 256.

The CXL memory device 240 issues the write request REQ_WR_MD including sensitive data MD through the CXL memory interface circuit 255 (S1324). The CXL switch 210 may transmit the write request REQ_WR_MD to the host 200.

The host 200 writes the sensitive data MD included in the write request REQ_WR_MD to the memory device 203 (S1326). In an example embodiment, the host 200 may replace and store the sensitive data MD in the location where the falsified sensitive data MD is stored in the memory device 203.

The host 200 issues a write response REP_WR_MD indicating that the writing of the sensitive data MD has been completed through the CXL host interface circuit 201 (S1328). When the writing of the sensitive data MD into the memory device 203 is completed, the host 200 may issue a write response REP_WR_MD.

Figure 14:
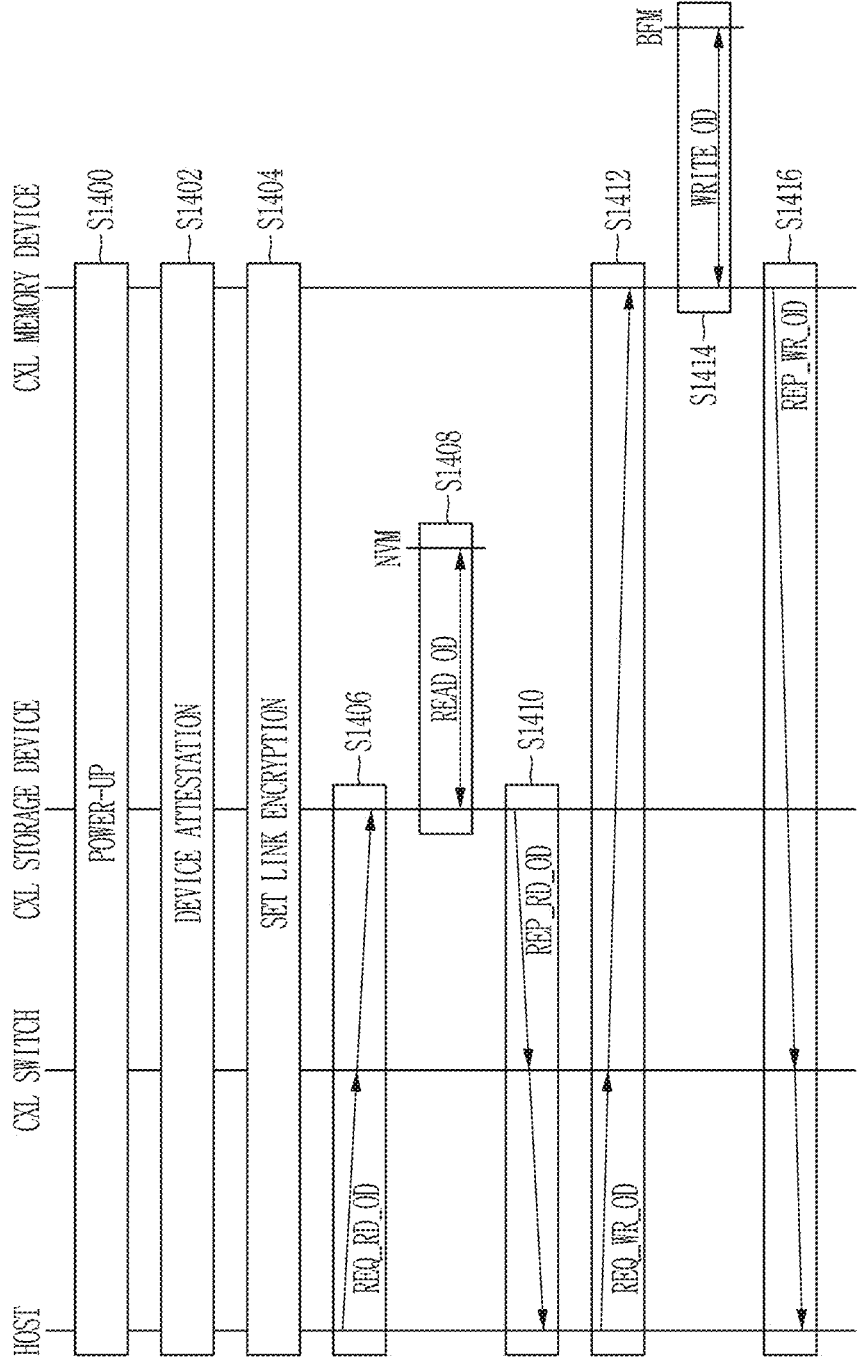
FIG. 14 is a flowchart illustrating the initial setting operation between the host and the CXL devices according to an example embodiment.

FIG. 14 is a flowchart illustrating the initial setting operation between the host and the CXL devices according to an example embodiment.

Referring to FIG. 14, the host 200, the CXL switch 205, the CXL storage device 220, and the CXL memory device 240 are powered up (S1400). The host 200 may transmit the power-up or initialization start information to the CXL devices 220 and 240 and the CXL switch 205. In response to the information on the power-up or initialization start, each of (or alternatively, at least one of) the CXL devices 220 and 240 and the CXL switch 205 may perform an individual initialization operation.

The host 200 performs the attestation between devices (S1402) and performs the CXL link encryption (S1404).

The host 200 issues the read request REQ_RD_OD to the CXL storage device 220 through the CXL host interface circuit 201 (S1406).

The CXL storage device 220 reads the sensitive data OD in response to the read request REQ_RD_OD (S1408).

The CXL storage device 220 issues the read response REP_RD_OD including the sensitive data OD through the CXL storage interface circuit 237 (S1410). The CXL switch 210 may transmit the read response REP_RD_OD to the host 200.

The host 200 issues the write request REQ_WR_OD including the sensitive data OD included in the read response REP_RD_OD (S1412). The CXL switch 210 may transmit the write request REQ_WR_OD to the CXL memory device 240.

The CXL memory device 240 writes the sensitive data OD included in the write request REQ_WR_OD into the buffer memory 257 (S1414). In an example embodiment, the CXL memory device 240 may store the sensitive data OD in the secured area within the buffer memory 257.

The CXL memory device 240 issues the write response REP_WR_OD through the CXL memory interface circuit 255 (S1416). The CXL switch 210 may transmit the write response REP_WR_OD to the host 200.

Figure 15:
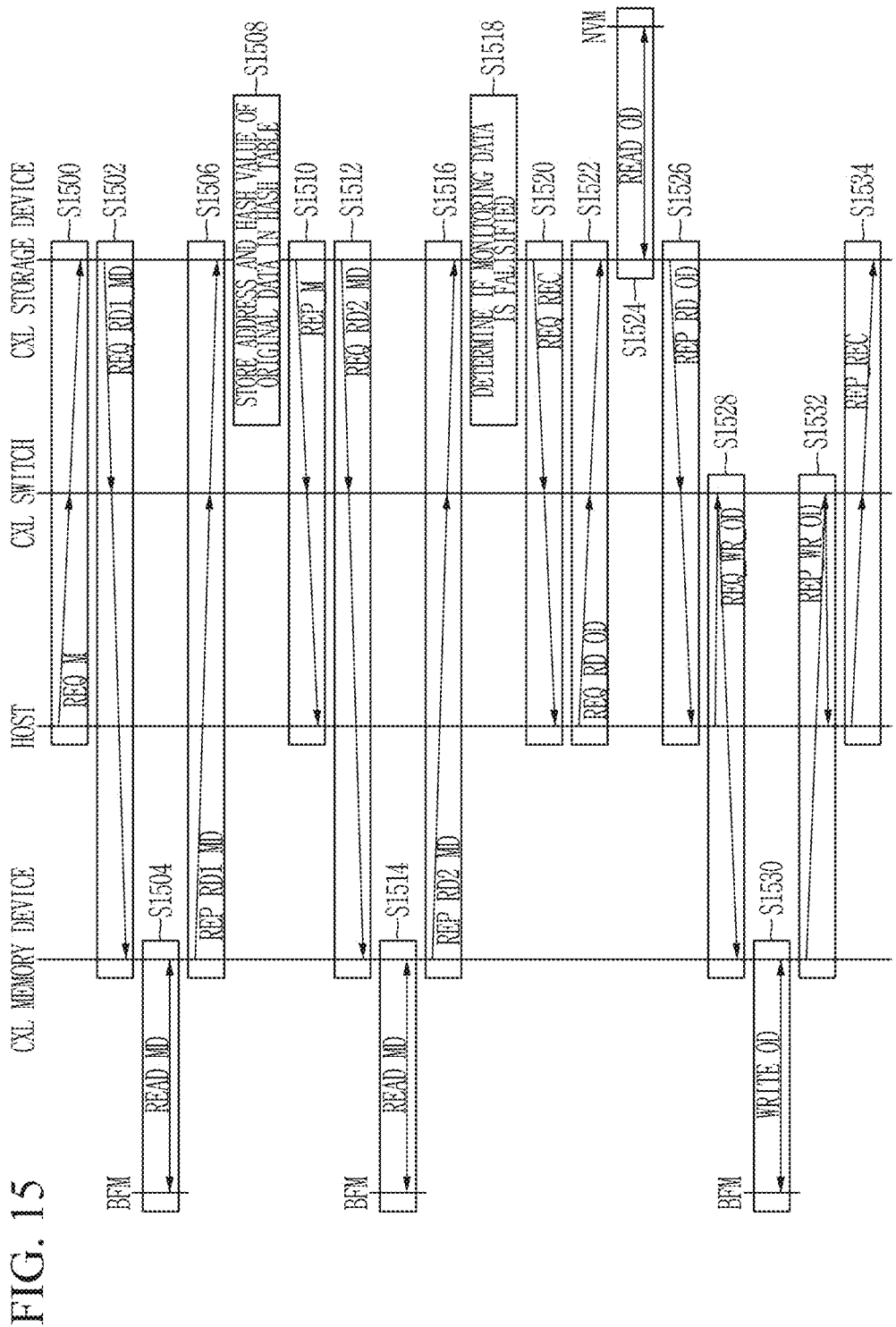
FIG. 15 is a flowchart illustrating the data recovery operation between the host and the CXL devices according to an example embodiment.

FIG. 15 is a flowchart illustrating the data recovery operation between the host and the CXL devices according to an example embodiment.

Referring to FIG. 15, the host 200 issues a monitoring request (REQ_M) to the CXL storage device 220 through the CXL host interface circuit 201 (S1500). The monitoring request (REQ_M) may be transmitted to the CXL switch 205. The CXL switch 205 may transmit the monitoring request REQ_M to the CXL storage device 220 which is the target of the monitoring request REQ_M. In some example embodiments, the monitoring request REQ_M may be a request for monitoring whether the sensitive data MD stored in the CXL memory device 240 is falsified, and may include the information on the location where the sensitive data MD is stored.

The CXL storage device 220 issues a first read request REQ_RD1_MD through the CXL storage interface circuit 237 in response to the monitoring request REQ_M (S1502). The first read request REQ_RD1_MD may be transmitted to the CXL switch 205. The CXL switch 205 may transmit the first read request REQ_RD1_MD to the CXL memory device 240 which is the target of the first read request REQ_RD1_MD. In some example embodiments, the first read request REQ_RD1_MD may be a request for reading the sensitive data MD stored in the buffer memory 257, and the sensitive data MD included in the monitoring request REQ_M may include the information on the stored location. For example, the first read request REQ_RD1_MD may include the start address and the length information indicating the location of the sensitive data MD in the buffer memory 257.

The CXL memory device 240 reads the sensitive data MD in response to the first read request REQ_RD1_MD (S1504). For example, the CXL memory controller 250 of the CXL memory device 240 may read the sensitive data MD from the area corresponding to the start address included in the first read request REQ_RD1_MD. In an example embodiment, the CXL memory controller 250 may read the sensitive data MD from the buffer memory 257

The CXL memory device 240 issues the first read response REP_RD1_MD including the sensitive data MD through the CXL host interface circuit 201 (S1506). The CXL switch 210 may transmit the first read response REP_RD1_MD to the CXL storage device 220.

The CXL storage device 220 stores the hash value of the sensitive data MD and the information on the location where the sensitive data MD is stored as the hash value table 232 (S1508). The CXL storage device 220 may perform a hash operation on the sensitive data MD included in the first read response REP_RD1_MD. The CXL storage device 220 may associate the hash value of the sensitive data MD with information on a location where the sensitive data is stored to store the information as the hash value table 232.

The CXL storage device 220 issues a monitoring response REP_M through the CXL storage interface circuit 237 (S1510). The CXL switch 210 may transmit the monitoring response REP_M to the host 200.

The CXL storage device 220 issues a second read request REQ_RD2_MD through the CXL storage interface circuit 237 by referring to the hash value table 232 (S1512). The second read request REQ_RD2_MD may be transmitted to the CXL switch 205. The CXL switch 205 may transmit the second read request REQ_RD2_MD to the CXL memory device 240 which is the target of the second read request REQ_RD2_MD. In some example embodiments, the second read request REQ_RD2_MD may be a request for reading the sensitive data MD stored in the buffer memory 257, and may include information on a location where the sensitive data MD included in the hash value table 232 is stored. For example, the second read request REQ_RD2_MD may include the start address and the length information indicating the location of the sensitive data MD in the buffer memory 257.

In an example embodiment, the CXL storage device 220 may issue the second read request REQ_RD2_MD by referring to the monitoring interval of the hash value table 232.

The CXL memory device 240 reads the sensitive data MD in response to the second read request REQ_RD2_MD (S1514). For example, the CXL memory controller 250 of the CXL memory device 240 may read the sensitive data MD from the area corresponding to the start address included in the second read request REQ_RD2_MD. In an example embodiment, the CXL memory controller 250 may read the sensitive data MD from the buffer memory 257.

The CXL memory controller 250 issues the second read response REP_RD2_MD including the sensitive data MD through the CXL memory interface circuit 255 (S1516). The CXL switch 210 may transmit the second read response REP_RD2_MD to the CXL storage device 220.

The CXL storage device 220 determines whether the sensitive data MD in the buffer memory 257 is falsified (S1518). The CXL storage device 220 may compare the hash value of the sensitive data MD included in the second read response REP_RD2_MD with the hash value stored in the hash value table 232 to determine whether the sensitive data MD in the buffer memory 257 is falsified.

When it is determined that the sensitive data MD in the buffer memory 257 is falsified, the CXL storage device 220 issues a recovery request REQ_REC to the host 200 through the CXL storage interface 237 (S1520). The recovery request REQ_REC may be transmitted to the CXL switch 205. The CXL switch 205 may transmit the recovery request REQ_REC to the host 200 that is the target of the recovery request REQ_REC. In some example embodiments, the recovery request REQ_REC may be a request for replacing the sensitive data MD stored in the buffer memory 257 with the sensitive data OD, and may include information on a location where the falsified sensitive data MD is stored.

The host 200 issues a third read request REQ_RD_OD through the CXL host interface circuit 201 in response to the recovery request REQ_REC (S1522). The third read request REQ_RD_OD may be transmitted to the CXL switch 205. The CXL switch 205 may transmit the third read request REQ_RD_OD to the CXL storage device 220 that is the target of the third read request REQ_RD_OD. The third read request REQ_RD_OD may include a logical block address corresponding to falsified sensitive data. The host 200 may check the logical block address corresponding to the falsified sensitive data based on the information on the location where the falsified sensitive data MD included in the recovery request REQ_REC is stored.

The CXL storage device 220 reads sensitive data OD in response to the third read request REQ_RD_OD (S1524). For example, the CXL storage controller 230 of the CXL storage device 220 may read the sensitive data OD from an area corresponding to an address included in the third read request REQ_RD_OD of the non-volatile memory 239.

The CXL storage device 220 issues the third read response REP_RD_OD including the sensitive data OD through the CXL storage interface circuit 237 (S1526). The CXL switch 210 may transmit the third read response REP_RD_OD to the host 200.

The host 200 issues the write request REQ_WR_OD including the sensitive data OD included in the third read response REP_RD_OD (S1528). The CXL switch 210 may transmit the write request REQ_WR_OD to the CXL memory device 240.

The CXL memory device 240 writes the sensitive data OD included in the write request REQ_WR_OD into the buffer memory 257 (S1530). In an example embodiment, the CXL memory device 240 may store the sensitive data OD in the location where the falsified sensitive data MD is stored.

The CXL memory device 240 issues the write response REP_WR_OD through the CXL memory interface circuit 255 (S1532). The CXL switch 210 may transmit the write response REP_WR_OD to the host 200.

The host 200 issues the recovery response REP_REC indicating that the recovery has been completed through the CXL host interface circuit 201 (S1534). When the writing of the sensitive data OD into the buffer memory 257 is completed, the host 200 may issue a recovery response REP_REC.

Figure 16:
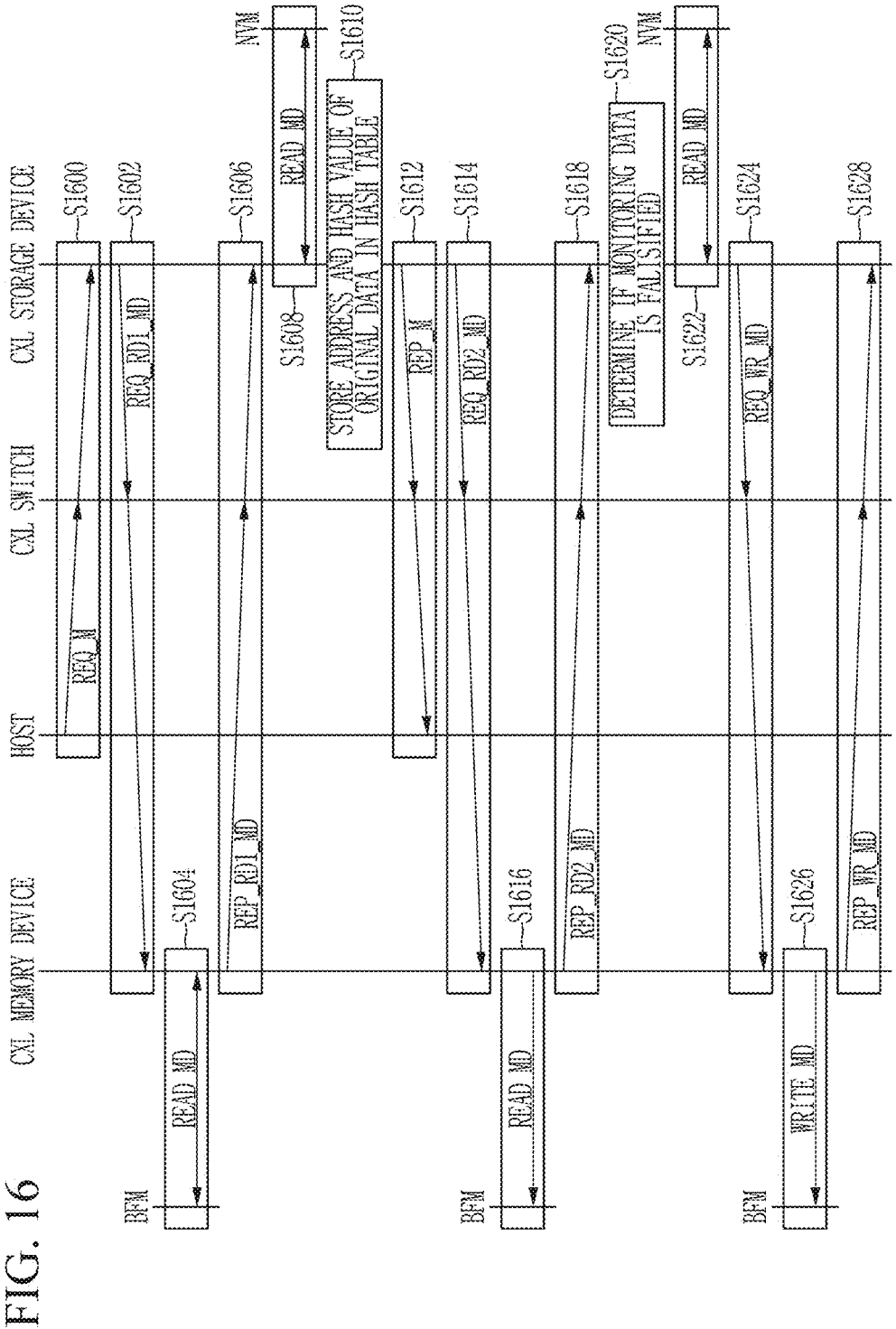
FIG. 16 is a flowchart illustrating the data recovery operation between the host and the CXL devices according to an example embodiment.

FIG. 16 is a flowchart illustrating the data recovery operation between the host and the CXL devices according to an example embodiment.

Referring to FIG. 16, the host 200 issues a monitoring request (REQ_M) to the CXL storage device 220 through the CXL host interface circuit 201 (S1600).

The CXL storage device 220 issues a first read request REQ_RD1_MD through the CXL storage interface circuit 237 in response to the monitoring request REQ_M (S1602). The first read request REQ_RD1_MD may be transmitted to the CXL switch 205. The CXL switch 205 may transmit the first read request REQ_RD1_MD to the CXL memory device 240 which is the target of the first read request REQ_RD1_MD.

The CXL memory device 240 reads the sensitive data MD in response to the first read request REQ_RD1_MD (S1604).

The CXL memory device 240 issues the first read response REP_RD1_MD including the sensitive data MD through the CXL host interface circuit 201 (S1606).

The CXL storage device 220 writes the sensitive data MD into the non-volatile memory 239 (S1608). In an example embodiment, the CXL storage device 220 may write the sensitive data MD into the non-volatile memory 239 using the flash interface circuit 238.

The CXL storage device 220 stores the hash value of the sensitive data MD, the information on the location where the sensitive data MD is stored in the memory device 203, and the information on the location where the sensitive data MD is stored in the non-volatile memory 239 as the hash value table 232 (S1610). The CXL storage device 220 may perform a hash operation on the sensitive data MD. The CXL storage device 220 may associate the hash value with the information on the location where the sensitive data of each of (or alternatively, at least one of) the memory device 203 and the non-volatile memory 239 is stored to store the information as the hash value table 232.

The CXL storage device 220 issues a monitoring response REP_M through the CXL storage interface circuit 237 (S1612). The CXL switch 210 may transmit the monitoring response REP_M to the host 200.

The CXL storage device 220 issues a second read request REQ_RD2_MD through the CXL storage interface circuit 237 by referring to the hash value table 232 (S1614). The second read request REQ_RD2_MD may be transmitted to the CXL switch 205. The CXL switch 205 may transmit the second read request REQ_RD2_MD to the CXL memory device 240 which is the target of the second read request REQ_RD2_MD. In some example embodiments, the second read request REQ_RD2_MD may be a request for reading the sensitive data MD stored in the buffer memory 257, and may include information on a location where the sensitive data MD included in the hash value table 232 is stored. For example, the second read request REQ_RD2_MD may include the start address and the length information indicating the location of the sensitive data MD in the buffer memory 257.

In an example embodiment, the CXL storage device 220 may issue the second read request REQ_RD2_MD by referring to the monitoring interval of the hash value table 232.

The CXL memory device 240 reads the sensitive data MD in response to the second read request REQ_RD2_MD (S1616).

The CXL memory controller 250 issues the second read response REP_RD2_MD including the sensitive data MD through the CXL memory interface circuit 255 (S1618).

The CXL storage device 220 determines whether the sensitive data MD in the buffer memory 257 is falsified (S1620).

When it is determined that the sensitive data MD in the buffer memory 257 is falsified, the CXL storage device 220 refers to the hash value table 232 and reads the sensitive data MD (S1622). For example, the CXL storage device 220 may read the sensitive data MD from an area corresponding to an address corresponding to the falsified sensitive data MD included in the hash value table 232. In an example embodiment, the CXL storage controller 230 may read the sensitive data MD from the nonvolatile memory 239 using the flash interface circuit 238.

The CXL storage device 220 issues a write request REQ_WR_MD including sensitive data MD through the CXL storage interface circuit 237 (S1624). The CXL switch 210 may transmit the write request REQ_WR_MD to the CXL memory device 240.

The CXL memory device 240 writes the sensitive data MD included in the write request REQ_WR_MD into the buffer memory 257 (S1626). In an example embodiment, the CXL memory device 240 may replace and store the sensitive data MD in the location where the falsified sensitive data MD is stored in the buffer memory 257.

The CXL memory device 240 issues a write response REP_WR_MD indicating that the writing of the sensitive data MD has been completed through the CXL memory interface circuit 255 (S1628). When the writing of the sensitive data MD into the memory device 203 is completed, the host 200 may issue a write response REP_WR_MD.

Figure 17:
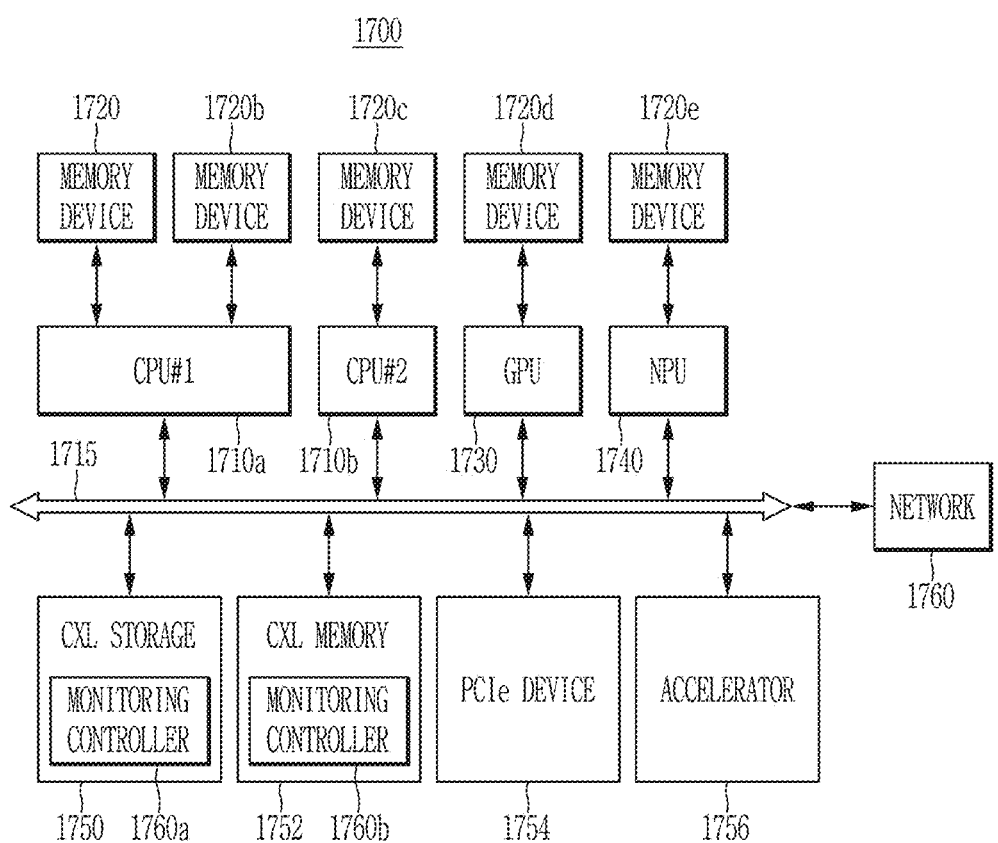
FIG. 17 is a block diagram of a computer system according to an example embodiment.

FIG. 17 is a block diagram of a computer system according to an example embodiment.

Referring to FIG. 17, a computer system 1700 may include a first CPU 1710a, a second CPU 1710b, a GPU 1730, an NPU 1740, a CXL switch 1715, a CXL memory device 1750, a CXL storage 1752, a PCIe device 1754, and an accelerator (CXL device) 1756.

The first CPU 1710a, the second CPU 1710b, the GPU 1730, the NPU 1740, the CXL memory device 1750, the CXL storage 1752, the PCIe device 1754, and the accelerator 1756 may be commonly connected to the CXL switch 1715, and each of (or alternatively, at least one of) them may communicate with each other through the CXL switch 1715.

In an example embodiment, each of (or alternatively, at least one of) the first CPU 1710a, second CPU 1710b, GPU 1730, and NPU 1740 may be a host described with reference to FIGS. 1 to 16, and each of (or alternatively, at least one of) them may be directly connected to individual memory devices 1720a, 1720b, 1720c, 1720d, and 1720e.

In an example embodiment, the CXL memory device 1750 and the CXL storage 1752 may be the CXL devices described with reference to FIGS. 1 to 16, and the monitoring controller 1760a of the CXL memory device 1750 and the monitoring controller 1760b of the CXL storage 1752 may monitor the sensitive data stored in the memory devices 1720a, 1720b, 1720c, 1720d, and 1720e without intervention of the first CPU 1710a, the second CPU 1710b, the GPU 1730, and the NPU 1740, and may notify at least one of the first CPU 1710a, the second CPU 1710b, the GPU 1730, and the NPU 1740 whether or not the sensitive data is falsified.

In an example embodiment, the CXL switch 1715 may be connected to a PCIe device 1754 or an accelerator 1756 configured to support various functions, the PCIe device 1754 or the accelerator 1756 may communicate with the first CPU 1710a, the second CPU 1710b, the GPU 1730, and the NPU 1740, respectively, or access the CXL memory device 1750 and the CXL storage 1752 via the CXL switch 1715.

In an example embodiment, the CXL switch 1715 may be connected to an external network 1760 or fabric and may be configured to communicate with an external server via the external network 1760 or fabric.

Figure 18:
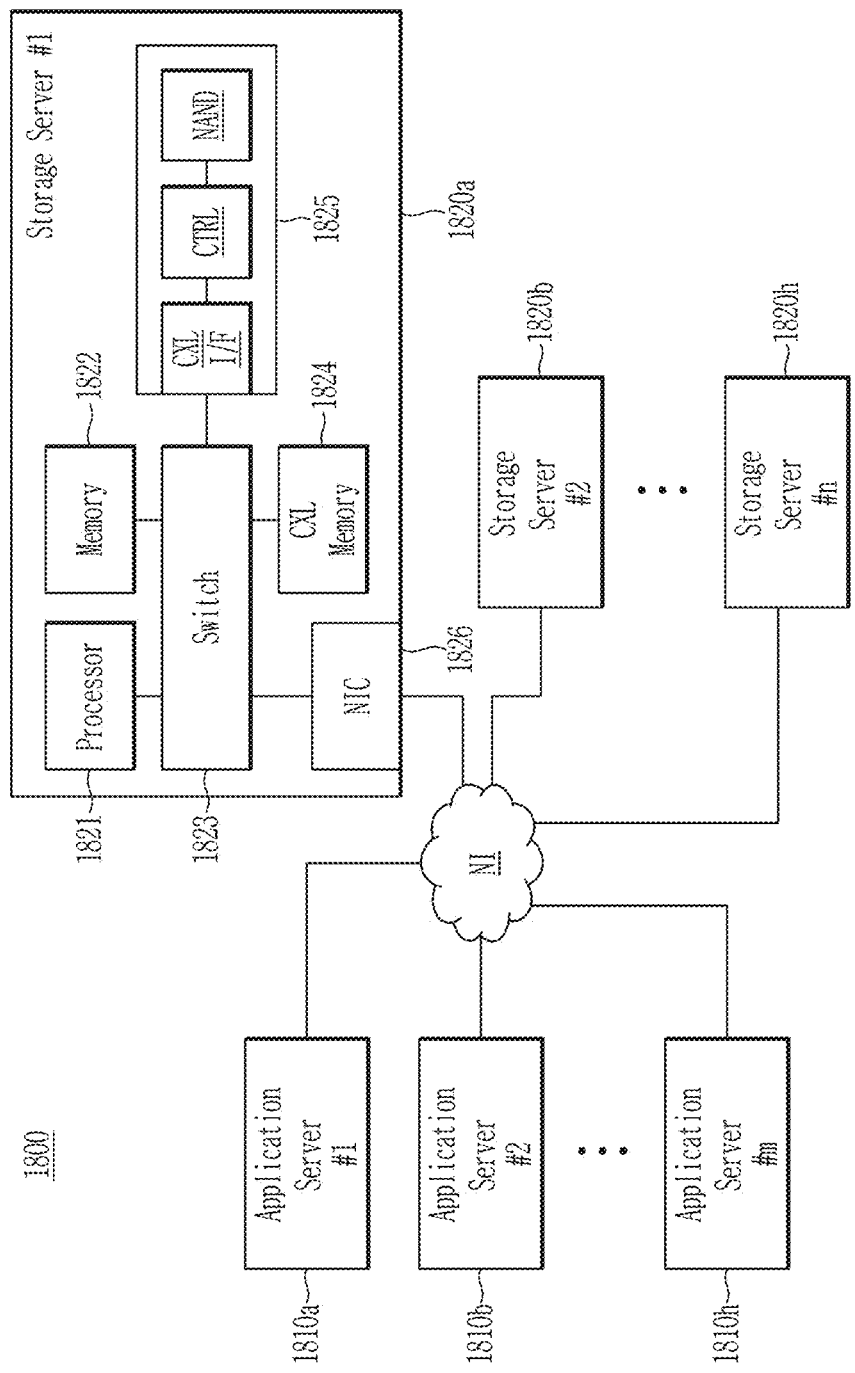
FIG. 18 is a block diagram of a server system according to an example embodiment.

FIG. 18 is a block diagram of a server system according to an example embodiment.

Referring to FIG. 18, a data center 1800 is a facility that stores various data and provides services, and may also be referred to as a data storage center. The data center 1800 may be a system for operating a search engine and database, and may be a computer system used by companies such as banks or government agencies. The data center 1800 may include application servers 1810a, . . . , 1810h and storage servers 1820a, . . . , 1820h. The number of application servers and the number of storage servers may be variously selected according to an example embodiment, and the number of application servers and the number of storage servers may be different from each other.

Hereinafter, the configuration of the first storage server 1820a will be mainly described. The application servers 1810a, . . . , 1810h and storage servers 1820a, . . . , 1820h may each have a structure similar to each other, and the application servers 1810a, . . . , 1810h and storage servers 1820a, . . . , 1820h may communicate with each other via a network NT.

The first storage server 1820a may include a processor 1821, a memory device 1822, a switch 1823, a storage 1825, a CXL memory device 1824, and a network interface card (NIC) 1826. The processor 1821 may control the overall operations of the first storage server 1820a, access the memory device 1822, execute instructions loaded in the memory device 1822, or process data. The processor 1821 and the memory device 1822 may be directly connected, and the number of processors 1821 and the number of memory devices 1822 included in one storage server 1820a may be variously selected.

In an example embodiment, the processor 1821 and the memory device 1822 may provide a processor-memory pair. In an example embodiment, the number of processors 1821 and the number of memory devices 1822 may be different from each other. The processor 1821 may include a single core processor or a multi-core processor. The above description of the storage server 1820 may be similarly applied to application servers 1810a, . . . , 1810h, respectively.

The switch 1823 may be configured to relay or route communication between various elements included in the first storage server 1820a. In an example embodiment, the switch 1823 may be the CXL switch described in FIG. 2. That is, the switch 1823 may be a switch implemented based on the CXL protocol.

The CXL memory device 1824 and the storage device 1825 may be the CXL devices described with reference to FIGS. 1 to 16.

The CXL memory device 1824 may be connected to the switch 1823. The storage apparatus 1825 may include a CXL interface circuit CXL_I/F, a controller CTRL, and a NAND flash NAND. The storage apparatus 1825 may store data or output stored data according to a request of the processor 1821.

The application servers 1810a, . . . , 1810h may not include the storage 1825.

A network interface card (NIC) 1826 may be connected to the CXL switch 1823. The NIC 1826 may communicate with other storage servers 1820a, . . . , 1820h or other application servers 1810a, . . . , 1810h via the network NT.

In an example embodiment, the NIC 1826 may include a network interface card, a network adapter, or the like. The NIC 1826 may be connected to the network NT by a wired interface, a wireless interface, a Bluetooth interface, an optical interface, or the like. The NIC 1826 may include an internal memory, a digital signal processor (DSP), a host bus interface, and the like, and may be connected to the processor 1821 and/or the switch 1823, and the like through the host bus interface. In an example embodiment, the NIC 1826 may be integrated with at least one of the processor 1821, the switch 1823, and the storage apparatus 1825.

In an example embodiment, the network NT may be implemented using Fiber Channel (FC), Ethernet, or the like. In this case, the FC is a medium used for relatively high-speed data transmission, and an optical switch providing high performance/high availability may be used. According to the access method of the network NT, the storage servers may be provided as file storage, block storage, or object storage.

In an example embodiment, network NT may be a storage-only network, such as a Storage Area Network (SAN). For example, the SAN may be an FC-SAN that uses an FC network and is implemented according to FC Protocol (FCP). As another example, the SAN may be an IP-SAN that uses a TCP/IP network and is implemented according to the SCSI over TCP/IP or Internet SCSI (iSCSI) protocol. In an example embodiment, the network NT may be a general network such as a TCP/IP network. For example, the network NT may be implemented according to protocols such as FC over Ethernet (FCoE), Network Attached Storage (NAS), and NVMe over Fabrics (NVMe-oF).

In an example embodiment, at least one of the application servers 1810a, . . . , 1810h may store data that a user or a client request to store in one of the storage servers 1820a, . . . , 1120h via the network NT. At least one of the application servers 1810a, . . . , 1810h, may acquire data that a user or a client requests to read from one of the storage servers 1820a, . . . , 1820h via the network NT. For example, at least one of the application servers 1810a, . . . , 1810h may be implemented as a web server, a database management system (DBMS), or the like.

In an example embodiment, at least one of the application servers 1810a, . . . , 1810h may access a memory included in another application server, a CXL memory, or a storage apparatus via the network NT, or may access memories, CXL memories, or the storage apparatuses included in the storage servers 1820a, . . . , 1820h via the network NT In this way, at least one of the application servers 1810a, . . . , 1810h may perform various operations on data stored in other application servers and/or storage servers. For example, at least one of the application servers 1810a, . . . , 1810h may execute an instruction for moving or copying data between other application servers and/or storage servers. In this case, data may move from the storage apparatus of the storage servers via the memories or CXL memories of the storage servers or directly move to the memories or the CXL memories of the application servers. The data moving via the network may be data encrypted for security or privacy.

In some example embodiments, each component or combination of two or more components described with reference to FIGS. 1 to 18 may be implemented as a digital circuit, programmable or unprogrammable logic device or array, application specific integrated circuit, ASIC), etc.

Any of the elements and/or functional blocks disclosed above may include or be implemented in processing circuitry such as hardware including logic circuits; a hardware/software combination such as a processor executing software; or a combination thereof. For example, the CXL storage controller 131, CXL memory controller 141, monitoring controller 231, monitoring controller 251, memory controller 202, monitoring controllers 1760a, 1760b, accelerator 1756 and controller CTRL may be implemented as processing circuitry. The processing circuitry specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc. The processing circuitry may include electrical components such as at least one of transistors, resistors, capacitors, etc. The processing circuitry may include electrical components such as logic gates including at least one of AND gates, OR gates, NAND gates, NOT gates, etc.

Processor(s), controller(s), and/or processing circuitry may be configured to perform actions or steps by being specifically programmed to perform those action or steps (such as with an FPGA or ASIC) or may be configured to perform actions or steps by executing instructions received from a memory, or a combination thereof.

Although the example embodiment of the present disclosure has been described in detail hereinabove, the scope of the present disclosure is not limited thereto. That is, several modifications and alterations made by a person of ordinary skill in the art using a basic concept of the present disclosure as defined in the claims fall within the scope of the present invention.

While this disclosure has been described in connection with what is presently considered to be practical example embodiments, it is to be understood that the invention is not limited to the disclosed example embodiments. On the contrary, it is intended to cover various modifications and equivalent arrangements included within the spirit and scope of the appended claims.

What is claimed is:

1. A storage apparatus for data integrity, comprising:
a compute express link (CXL) interface configured to connect the storage apparatus to a host;
a hash value table configured to store information on a secured area from a main memory of the host and a first hash value corresponding to the secured area; and
a monitoring controller separate from the host,
the monitoring controller configured, responsive to a monitoring request received from the host through the CXL interface, to read sensitive data stored in the secured area from the main memory of the host through the CXL interface based on the information on the secured area, calculate a second hash value of the sensitive data, compare the second hash value of the sensitive data with the first hash value corresponding to the secured area to determine whether the sensitive data is falsified, and recover falsified sensitive data in response to determining that the sensitive data is falsified,
wherein the monitoring request includes information on a location in the main memory and information on a monitoring interval corresponding to the secured area, and
the monitoring controller is further configured to read first data stored in the location from the main memory through the CXL interface based on the information on the location, calculate a hash value of the first data, store the information on the location as the information on the secured area in the hash value table, and store the hash value of the first data as the first hash value corresponding to the secured area, and
wherein the hash value table is further configured to store the information on the monitoring interval corresponding to the secured area, and
the monitoring controller is further configured to read the sensitive data stored in the secured area from the main memory at a timing based on the monitoring interval.

2. The storage apparatus of claim 1, wherein:
in response to determining that the sensitive data is falsified, the monitoring controller is further configured to notify the host that the sensitive data is falsified through the CXL interface.

3. The storage apparatus of claim 2, further comprising:
a non-volatile memory configured to store the first data, wherein the monitoring controller is further configured to receive a read request from the host through the CXL interface, read the first data stored in a logical block address included in the read request from the non-volatile memory, and transmit the first data to the host through the CXL interface to recover the falsified sensitive data.

4. The storage apparatus of claim 1, further comprising:
a non-volatile memory configured to store the first data, wherein the monitoring controller is further configured to store a logical block address, in which the first data of the non-volatile memory is stored, in the hash value table, in correspondence to the secured area.

5. The storage apparatus of claim 4, wherein:
in response to determining that the sensitive data is falsified, the monitoring controller is further configured to read the first data from the non-volatile memory based on the logical block address stored in correspondence to the secured area in the hash value table, and transmit a write request to replace the falsified sensitive data with the first data through the CXL interface.

6. The storage apparatus of claim 1, wherein:
the main memory includes a buffer memory of a CXL memory device configured to communicate with the host and the monitoring controller through the CXL interface.

7. The storage apparatus of claim 1, further comprising:
a buffer memory configured to store the first data, wherein the monitoring controller is further configured to store, in the hash value table, information on a location where the first data is stored in the buffer memory in correspondence to the secured area.

8. The storage apparatus of claim 1, wherein:
the hash value table further stores information on a recovery policy corresponding to the secured area, and
in response to determining that the sensitive data is falsified, the monitoring controller is configured to notify the host that the sensitive data is falsified according to the recovery policy or transmit a write request to recover the falsified sensitive data through the CXL interface.

9. A method for data integrity performed by a storage apparatus including a monitoring controller, the method comprising:
receiving at the storage apparatus a monitoring request from a host through a compute express link (CXL) interface, the monitoring request including information on a location in a main memory of the host and information on a monitoring interval, and the storage apparatus being separate from the host;
reading first data stored in the location from the main memory based on the information on the location through the CXL interface;
calculating a hash value of the first data using the monitoring controller;
storing, in a hash value table, the information on the location as information on a secured area and the hash value of the first data as a first hash value corresponding to the secured area;
storing, in the hash value table, the monitoring interval as corresponding to the secured area;
reading sensitive data stored in the secured area from the main memory based on the information on the secured area through the CXL interface;
calculating a second hash value of the sensitive data using the monitoring controller; and
comparing the second hash value of the sensitive data with the first hash value corresponding to the secured area to determine whether the sensitive data is falsified using the monitoring controller,
wherein the reading the sensitive data stored in the secured area comprises reading the sensitive data at a timing based on the monitoring interval.

10. The method of claim 9, further comprising:
in response to determining that the sensitive data is falsified, notifying the host that the sensitive data is falsified through the CXL interface.

11. The method of claim 10, further comprising:
receiving a read request from the host through the CXL interface;
reading the first data stored in the main memory from a logical block address included in the read request; and
transmitting the first data to the host through the CXL interface.

12. The method of claim 9, further comprising:
storing a logical block address, in which the first data of the main memory is stored, in the hash value table, in correspondence to the secured area;
in response to determining that the sensitive data is falsified, reading the first data from the main memory based on the logical block address stored in correspondence to the secured area in the hash value table; and
transmitting a write request to replace falsified sensitive data with the first data through the CXL interface.

13. A computer system, comprising:
a host configured to transmit a monitoring request including information on a location in memory and information on a monitoring interval; and
a first compute express link (CXL) device including a CXL interface and a monitoring controller, the first CXL device being separate from the host, and
the first CXL device being configured to
receive the monitoring request from the host through the CXL interface,
read first data stored in the location from the memory based on the information on the location through the CXL interface,
calculate a hash value of the first data using the monitoring controller,
store, in a hash value table, the information on the location as information on a secured area, the hash value of the first data as a first hash value corresponding to the secured area, and the monitoring interval,
read sensitive data stored in the secured area from the memory based on the information on the secured area through the CXL interface,
calculate a second hash value of the sensitive data using the monitoring controller, and
compare the second hash value of the sensitive data with the first hash value corresponding to the secured area to determine whether the sensitive data is falsified using the monitoring controller,
wherein the first CXL device is configured to read the sensitive data stored in the secured area at a timing based on the monitoring interval.

14. The computer system of claim 13, wherein:
the memory is configured to directly communicate with the host through a double data rate (DDR) interface.

15. The computer system of claim 13, further comprising:
a second CXL device including the memory, the second CXL device configured to communicate with the host and the first CXL device through the CXL interface.

16. The computer system of claim 13, wherein:
in response to determining that the sensitive data is falsified, the first CXL device is configured to notify the host that the sensitive data is falsified through the CXL interface, and
the host is configured to transmit a read request to read original sensitive data stored in the memory through the CXL interface, receive the original sensitive data from the memory through the CXL interface, and recover the sensitive data to the original sensitive data.

17. The computer system of claim 16, wherein:
the first CXL device includes the memory.

* * * * *